(12) United States Patent
Ohrstrom et al.

(10) Patent No.: US 11,212,953 B2
(45) Date of Patent: Jan. 4, 2022

(54) VEHICLE ATTACHMENT CARRIER LOADING GUIDANCE

(71) Applicant: Deere and Company, Moline, IL (US)

(72) Inventors: Nicholas A. Ohrstrom, Bettendorf, IA (US); Nathan R. Vandike, Geneseo, IL (US); Duane M. Bomleny, Geneseo, IL (US); Colin D. Engel, Bettendorf, IA (US); Stephen R. Corban, Kewanee, IL (US)

(73) Assignee: Deere & Company, Moline, IL (US)

( * ) Notice: Subject to any disclaimer, the term of this patent is extended or adjusted under 35 U.S.C. 154(b) by 155 days.

(21) Appl. No.: 16/750,072

(22) Filed: Jan. 23, 2020

(65) Prior Publication Data

US 2021/0127550 A1 May 6, 2021

Related U.S. Application Data

(63) Continuation-in-part of application No. 16/670,369, filed on Oct. 31, 2019.

(51) Int. Cl.
*A01B 69/00* (2006.01)
*A01B 69/08* (2006.01)
*B60D 1/36* (2006.01)
*A01B 59/06* (2006.01)
*B60D 1/00* (2006.01)

(52) U.S. Cl.
CPC .......... *A01B 69/001* (2013.01); *A01B 59/061* (2013.01); *A01B 69/006* (2013.01); *B60D 1/36* (2013.01); *B60D 2001/001* (2013.01)

(58) Field of Classification Search
CPC .................................................. A01B 69/001
See application file for complete search history.

(56) References Cited

U.S. PATENT DOCUMENTS

| | | | |
|---|---|---|---|
| 7,204,504 B2 | 4/2007 | Gehring et al. | |
| 9,950,739 B2* | 4/2018 | Watanabe | B62D 15/0295 |
| 10,046,613 B2* | 8/2018 | Shepard | B60D 1/06 |
| 10,617,054 B2* | 4/2020 | Gresch | A01B 59/066 |
| 10,795,372 B2* | 10/2020 | Runde | G05D 1/0219 |
| 10,875,167 B2* | 12/2020 | Bookwala | B25D 9/14 |
| 2002/0125018 A1 | 9/2002 | Bernhardt et al. | |
| 2008/0116657 A1 | 5/2008 | Coers et al. | |
| 2011/0102196 A1* | 5/2011 | Kadowaki | B62D 15/0275 340/932.2 |

(Continued)

FOREIGN PATENT DOCUMENTS

| | | |
|---|---|---|
| EP | 1862050 | 12/2007 |
| EP | 2682329 | 8/2014 |

(Continued)

*Primary Examiner* — Shelley Chen
(74) *Attorney, Agent, or Firm* — Rathe Lindenbaum LLP

(57) ABSTRACT

A vehicle attachment carrier loading guidance system may include a sensor for being supported by vehicle supporting a removable attachment having a mount interface for interacting with a mount on an attachment carrier distinct from the vehicle, wherein the sensor is output steering angle signals. The system may further comprise a controller to output presentation signals based upon the steering angle signals. The presentation signals are to generate a visual representation of a projected path of the mount interface with respect to the mount.

17 Claims, 9 Drawing Sheets

(56) References Cited

U.S. PATENT DOCUMENTS

| | | | | |
|---|---|---|---|---|
| 2014/0064897 | A1* | 3/2014 | Montgomery | E02F 9/262 |
| | | | | 414/685 |
| 2016/0236526 | A1* | 8/2016 | Shepard | B60D 1/36 |
| 2016/0302357 | A1 | 10/2016 | Tippery et al. | |
| 2017/0115730 | A1* | 4/2017 | Ebel | G02B 27/017 |
| 2018/0061102 | A1* | 3/2018 | Goto | B62D 15/0295 |
| 2019/0096261 | A1* | 3/2019 | Hayashi | B60R 1/00 |

FOREIGN PATENT DOCUMENTS

| | | | | |
|---|---|---|---|---|
| JP | 2010195265 | A | * | 9/2010 |
| JP | 5404095 | B2 | * | 1/2014 |

* cited by examiner

VEHICLE ATTACHMENT CARRIER LOADING GUIDANCE

CROSS REFERENCE TO RELATED APPLICATION

The present application is a continuation-in-part of co-pending U.S. patent application Ser. No. 16/670,369 filed on Oct. 31, 2019 by Ohstrom et al and entitled VEHICLE CONNECTION GUIDANCE, the full disclosure of which is hereby incorporated by reference.

BACKGROUND

Attachments are frequently connected to vehicles. Some attachments are cantilevered from the front or rear of vehicle so as to be carried by the vehicle. Other attachments include wheels or other ground engaging members, wherein the vehicle pushes or pulls the attachment. In some circumstances, the attachments are carried and transported to and from a worksite or field by a separate attachment carrier, such as a trailer, which may be pulled by the vehicle or by a different vehicle.

Figure 1:
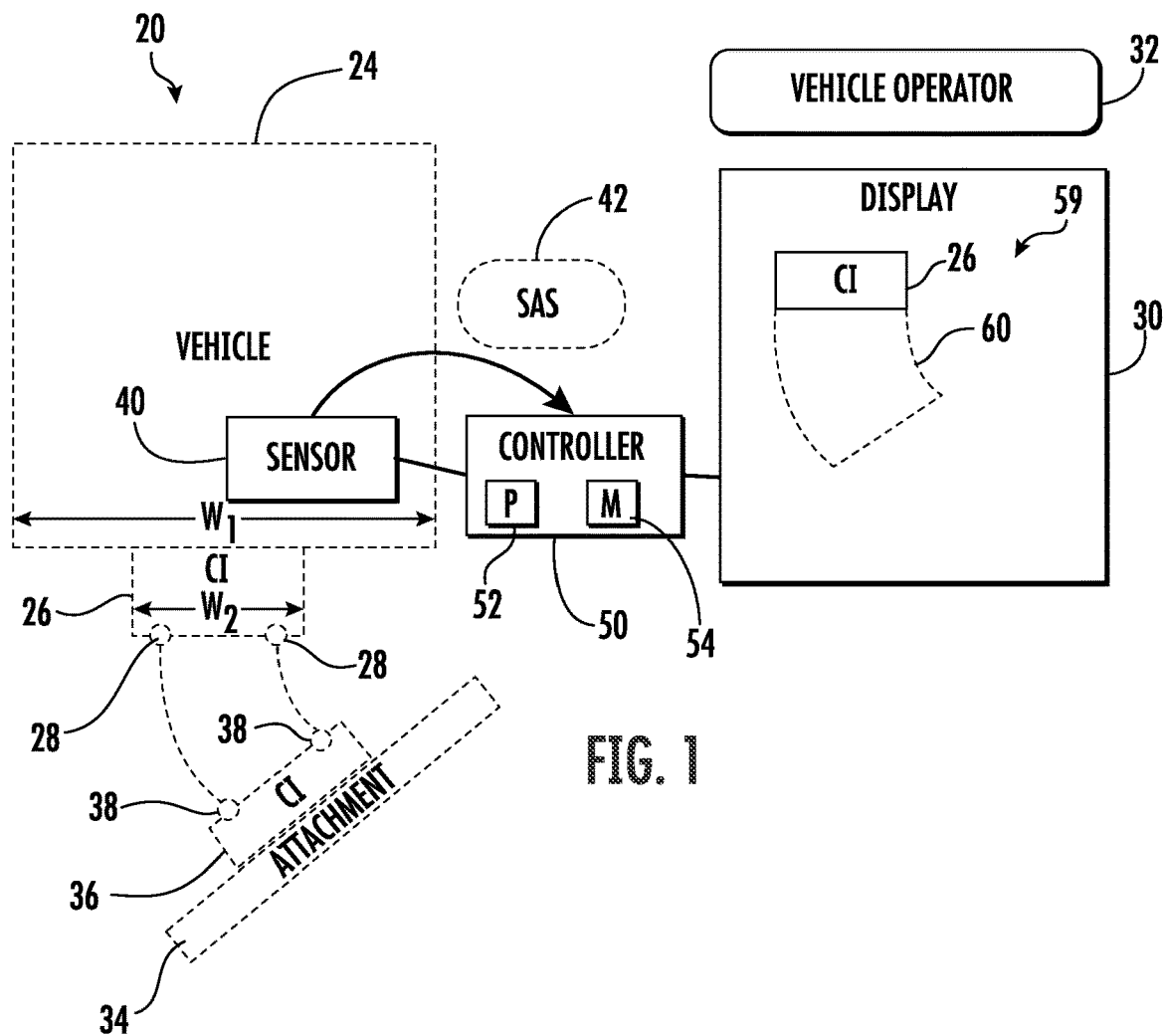
FIG. 1 is a block diagram schematically illustrating portions of an example vehicle connection guidance system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

The use of vehicle attachments often involves multiple tasks: (1) connecting the vehicle to the attachment and (2) loading the attachment onto an attachment carrier when use of the attachment is completed. Connecting the vehicle to the attachment may demand precise alignment and parallelism of the vehicle and the attachment. Loading the attachment onto the attachment carrier may demand precise alignment and parallelism of the attachment and the attachment carrier. Achieving precise alignment and parallelism is often challenging and time-consuming.

The first portion of this disclosure describes a system for guiding the connection of the vehicle to an attachment having multiple connection points. Although attachments that include multiple connection points facilitate enhanced control over the angle of the attachment relative to the vehicle, connecting such attachments to the vehicle may be difficult. Connecting to an attachment having a single connection point, such as a hitch pin or ball hitch, merely demands alignment with the single connection point at any angle. In contrast, connecting a vehicle to an attachment with multiple connection points across a wide width may demand that connection interface of the vehicle and the attachment be parallel to one another upon connection. Achieving such a parallel relationship between the connection interfaces of the vehicle and the attachment is often a challenge for an operator steering the vehicle.

The second portion of this disclosure describes a system for guiding the loading of an attachment onto an attachment carrier, such as a trailer or bed of a vehicle. Many attachment carriers include mounts, structures that provide enhanced securement of the attachment to the carrier. Such mounts may be in the form of cradles, projections, cavities or the like that receive, project into, interlock or otherwise interact with corresponding mount interfaces provided on the attachment. In some implementations, the mount interfaces on the attachment are provided solely for the purpose of securing the attachment to an attachment carrier. In other implementations, the mount interfaces may comprise structures of the attachment that are also intended to serve as part of other primary functions of the attachment itself. Properly aligning the mount interface of the attachment to the mounts of the carrier is often challenging. This challenge may be exacerbated in circumstances where the mount interface or interfaces of the attachment are not readily viewable by the operator steering the vehicle carrying the attachment towards the carrier.

I. Vehicle Connection Guidance System

Disclosed are example vehicle connection guidance systems and methods that assist the operator in connecting a vehicle to an attachment across multiple connection points. Disclosed are example vehicle connection guidance systems and methods that assist the operator in achieving a parallel relationship between the vehicle and the attachment when being connected to one another. The example vehicle connection guidance systems and methods are especially well suited to assist in the connection of a feeder house of a harvester to a header.

Disclosed is an example vehicle connection guidance system that may include a sensor and a controller. The sensor is configured to be supported by a vehicle having a first width and a connection interface, the connection interface having a second width different than the first width and along which multiple connection points lie, wherein the sensor is to output steering angle signals. The controller is configured to output presentation signals based upon the steering angle signals. The presentation signals are to generate a visual presentation of a projected path of the width of the connection interface to an operator of the vehicle.

Disclosed is an example vehicle connection guidance method. The method may include receiving steering angle signals from a sensor indicating a current steering angle of a vehicle having a connection interface, wherein the connection interface has a width along which multiple connection points are located. The method may further include overlaying a projected path of the width of the connection interface on a real-time view of an approach of the vehicle towards an attachment based upon the steering angle signals.

Disclosed is an example harvester. The example harvester may include a feeder house, a header connection interface proximate the feeder house, a camera to capture a real-time image of an approach of the feeder house towards a header, a display to present the real-time image of the approach captured by the camera, a sensor to output steering angle signals indicative of a steering angle of the harvester during the approach and a controller to output control signals causing the display to overlay a width of the header connection interface and a representation of a width of the header on the real-time image of the approach being presented by the display.

FIG. 1 is a block diagram schematically illustrating portions of an example vehicle connection guidance system 20. System 20 guides and assists in operator in connecting a vehicle to an attachment having a connection interface having multiple spaced connection points. System 20 is configured for use with a vehicle 24 having a first width W1 and a connection interface (CI) 26 having a second width W2 different than the first width W1, and along which multiple connection points 28 (schematically illustrated) extend. The multiple connection points 28 may be in the form of distinct individual connection points spaced along width W2, such as spaced hooks, clevises, bars, attachment openings or the like which inhibit unintended or uncontrolled pivoting or rotation of the attachment relative to the vehicle about a generally vertical axis. In other implementations, the multiple connection points 28 may be in the form of spaced surfaces that are provided by and part of a single continuous bar or other structure, wherein the spaced surfaces provide multiple connection points to inhibit unintended or uncontrolled pivoting or rotation of the attachment relative to the vehicle about a generally vertical axis.

In one implementation, vehicle 24 comprises a vehicle that is steerable through different actuation of ground engaging or motive members, such as wheels or tracks. In one implementation, the steering or turning of the vehicle is achieved through the output of control signals from a controller causing the different actuation of pumps, motors or mechanical or hydraulic transmissions which cause different ground engaging members on different sides of the vehicle to travel or be driven at different speeds. Such control signals may be generated in response to operator input, such as a turning of the steering wheel, movement of a joystick or on either input provided by an operator 32. In yet other implementations, the operator input controlling the turning of the vehicle may be directly transmitted by a steering transmission to the ground engaging or motive members, with or without power assist.

As schematically shown by FIG. 1, system 20 is also configured for use with a display 30. For purposes of this disclosure, the phrase "configured to" denotes an actual state of configuration that fundamentally ties the stated function/use to the physical characteristics of the feature proceeding the phrase "configured to". The display 30 may comprise a monitor or other screen device present a visual image. The display 30 may be mounted to and carried by vehicle 24 for viewing by an operator 32 riding vehicle 24. In other implementations, the display 30 may be at a location remote from vehicle 24, wherein the operator 32, also remote from vehicle 24, remotely controls vehicle 24.

System 20 may be incorporated into vehicle 24 or provided as part of a system with vehicle 24 at the time that vehicle 24 is initially implemented and used following manufacture. In other implementations, system 20 may be provided as an add-on or aftermarket addition for use with an existing vehicle 24. In some implementations, display 30 may be provided as part of the system added to the existing vehicle 24. System 20 comprises sensor 40 and controller 50.

Sensor 40 comprises at least one sensor supported by vehicle 24. Sensor 40 is configured to output steering angle signals. In one implementation, sensor 40 comprises a sensor that detects the steering input provided by operator 32 such as rotation of a steering wheel, movement of a joystick or the like. In such an implementation, sensor 40 generates the steering angle signals based upon the detected steering input, wherein the steering angle signals are not only used by system 20 to guide the operator in providing additional steering input, but are also used to control the actuators, hydraulic pumps, motors, hydraulic transmissions or mechanical transmissions that maneuver the ground engaging or motive members of the vehicle to achieve turning. In one implementation, sensor 40 may comprise a potentiometer that senses rotation of a steering column in response to turning of a steering wheel.

In yet other implementations, sensor 40 is distinct from a second sensor that detects steering input from operator 32 and that generates control signals for controlling the actuators that maneuver the ground engaging members. In such an implementation, sensor 40 may sense the maneuvering of the ground engaging members that result from the control signals generated by the second sensor. For example, in one implementation, sensor 40 may comprise a potentiometer that senses rotation or movement of a steering linkage or axle of a wheel of vehicle 24.

Controller 50 comprises an electronic device or component that outputs presentation signals to display 30 based upon steering angle signals 42 from sensor 40. Controller 50 comprises a processor 52 and a memory 54. Processor 52 carries out instructions contained in memory 54. Memory 54 stores such instructions and may be in the form of software programmed code. In other implementations, memory 54 may be in the form of an integrated circuit, wherein the instructions are in the form of an architecture of various logic components. The instruction contained in memory 54 directs processor 52 to receive the steering angle signals 42 from sensor 40, to analyze the steering angle signals 42 by evaluating the current angle being dictated for the ground motive members and using the current angle to determine a path of vehicle 24 and connection interface 26. The instructions contained in memory 54 further direct processor 52 to generate presentation signals based upon the determined path.

The presentation signals cause display 30 to generate a visual presentation 59 comprising a projected path 60 of the width W2 of the connection interface 26 to operator 32 given the current steering angle signals indicating the current steering angle of vehicle 24. In one implementation, the projected path presents an outline of the edges of the path, the edges being spaced apart by the width or proportional width of connection interface 26. By providing a visual presentation of a projected path 60 of the width W2 of the connection interface, encompassing both connection points 28 (in contrast to displaying the entire width W1 of vehicle 24), controller 50 provides a visual presentation that may better assist operator 32 in aligning the multiple connection points 28 to the corresponding multiple connection points of the connection interface of the attachment to be connected to the vehicle 24 and achieving a parallel relationship between the two connection interfaces of the vehicle and the attachment.

As shown by FIG. 1, in some implementations, the presentation signals output by controller 50 may further cause the generation of a visual presentation 59 that further comprises at least a portion of the connection interface 26 itself at its current location and orientation. For example, in one implementation, a graphic representing the connection interface 26 may be depicted at the beginning of the path. In some implementations, the visual presentation may include an animation illustrating movement of the connection interface 26 along the path.

In such an implementation, the shape and size of the connection interface 26 may be stored in memory 54 or elsewhere and used by controller 50 to generate the visual presentation of the connection interface 26. In some implementations, the shape and size of the connection interface 26 may be determined by controller 50 from an image of connection interface 26 as captured by a camera carried by vehicle 24. For example, in the case of a connection interface mounted at the front of vehicle 24, a camera may be mounted at the front aimed down at the connection interface 26. In the case of connection interface 26 at a rear of vehicle 24, a camera may be mounted at a rear of vehicle 24 and aimed down at the connection interface 26. The same camera may be used to capture an image of the connection interface such as when the visual presentation 59 includes a depiction of the connection interface 26. In other implementations, the presentation signals may cause display 30 to present just the path 60 of connection interface 26 without connection interface 26, wherein the width of the path corresponds to the width of the connection interface 26.

As shown by FIG. 1, the visual presentation 59 of the projected path 60 has a width corresponding to or otherwise proportional to the width W2 of the connection interface 26. Controller 50 may obtain this width W2 from a prior value stored in memory 54. In another implementation, controller 50 may obtain width W2 by prompting operator 32 or another person to enter the width W2. In another implementation, controller 50, following instruction contained in memory 54, may wirelessly access a server database containing width W2, based upon an internal identifier or based upon an operator input identifier for connection interface 26 or vehicle 24.

In yet other implementations, controller 50 may prompt the operator or another person to capture an image of connection interface 26 using a smart phone or camera having an augmented reality application that determines a measurement based upon the captured image. For example, controller 50 may prompt the operator or another person to use the Iphone™ Measure app, wherein the measurements of the connection interface may be obtained and transmitted to controller 50 for determining the width and center of the path 60 that is displayed or projected. In another implementation, controller 50 may follow instruction contained memory 54 for identifying edges of a captured image of interface 26 to determine the shape and dimensions of the interface 26. In yet other implementations, controller 50 may use optical recognition to identify the particular connection interface 26 and thereafter obtain its measurements from an Internet server database resource. In each of such cases, system 20 may be utilized with any of a variety of multiple different vehicle 24 having different interfaces 26. Given the determined center of connection interface 26, its determined width, and the current angle of the ground engaging motive members (wheels or tracks) from the steering angle single 42, controller 50 may determine and generate the path 60.

In one implementation, the visual presentation of the projected path 60 is overlaid upon a real-time camera captured image of the terrain or surroundings across or through which connection interface 26 will be moved as it travels along the determined future path. The camera captured image serves as a background on display 30 for the projected path 60.

In yet other implementations, the projected path 60 may be presented on display 30 relative to a controller generated graphic representing the attachment and its connection interface. For example, in one implementation, vehicle 24 may comprise a camera that captures an image of the current location and orientation of the attachment, wherein controller 50 then utilizes captured image to generate a graphical image that represents or corresponds to the current location and orientation of the attachment. In some implementations, the controller generated image of the attachment and its computer interface may be generated based upon signals from sensors associated with the attachment and/or its connection interface.

In one implementation, system 20 may be operable in various different modes selectable by the operator or based upon lighting conditions, wherein each mode presents the visual presentation of the projected path 60 in a different manner. In one mode, the visual presentation of the projected path 60 may be presented to the operator 32 and multiple concurrent manners. For example, in one mode of operation, controller 50 may output presentation signals which are to cause a projector carried by vehicle 24 to project the visual presentation of the projected path 60 directly onto the surrounding terrain or environment, wherein the operator 32 may see the projected path 60 directly on the surrounding terrain or environment. In one implementation, the projection of the projected path 60 may be illuminated by a laser or other illumination system carried by vehicle 24 and operated under the control of controller 50.

In yet another mode of operation, controller 50 may output presentation signals which are to cause a projector carried by vehicle 24 to project the visual presentation of the projected path 60 onto a windshield or window of vehicle 24 through which the operator 32 views the surrounding terrain or environment. In some implementations, the operator may select a mode where the projected path 60 is concurrently presented on display 30 and directly projected onto the surrounding terrain or environment through which vehicle 24 is to move during connection to the attachment. In yet other implementations, display 30 may be incorporated as part of the window or windshield, wherein the presentation signals output by controller 50 cause the window or windshield to incorporate display 30 to generate a visual presentation of the projected path 60.

Figure 2:
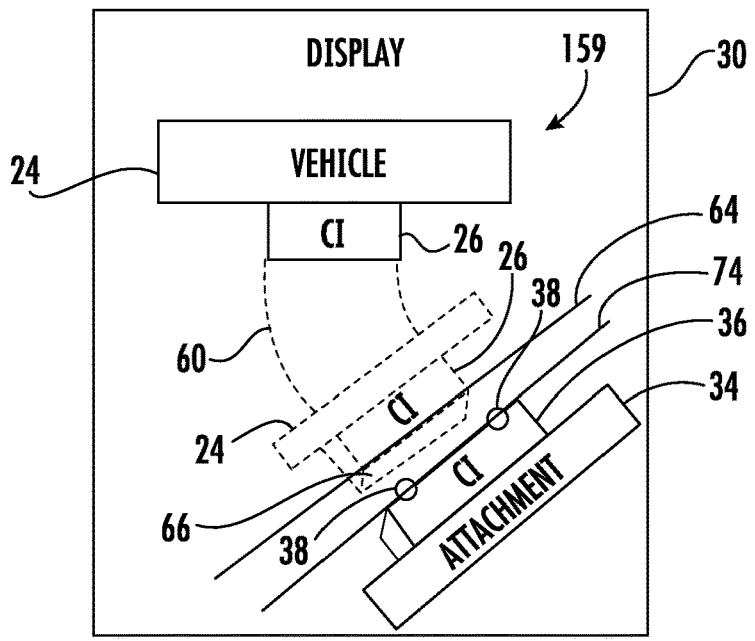
FIG. 2 is a diagram illustrating an example visual presentation presented by the example vehicle connection guidance system of FIG. 1.

In the example illustrated in FIG. 1, the connection interface 26 of vehicle 24 is to be moved, forwardly or rearwardly, into connection with a corresponding connection interface 36 having multiple spaced connection points 38 to facilitate connection to the associated attachment 34. FIG. 2 illustrates another example of a visual presentation 159 that may be presented on display 30, that may be presented on the windshield or that may be projected onto the actual terrain/environment in response to the presentation signals output by controller 50. In the example illustrated, the visual presentation 159 not only includes a visual presentation of the projected path 60 of the connection interface, but additionally includes a depiction of connection interface 26 itself, and at least portions of vehicle 24. In some implementations, visual presentation 159 additionally includes a depiction of the attachment 34 and its connection interface 36 along with connection points 38.

In the example illustrated, the presentation signals output by controller 50 cause the visual presentation 159 to further include a connector line 64 which corresponds to the connecting edge of connection interface 26 and which has a width much greater than the width of connection interface 26. The connector lines 64 may be in the form of a virtual bright line or other visible marking extending beyond the side edges of connection interface 26. Connector line 64 assists the operator in determining the degree to which connection interface 26 and the connection points 28, through which line 64 may extend, is parallel to the connection interface 36 of attachment 34 as connection interface 26 is moved towards attachment 34.

In the example illustrated, to further assist the operator and steering vehicle 24 so as to bring connection interfaces 26 and 36 and aligned in parallel relationship, controller 50 may generate presentation signals which cause presentation 159 to additionally depict a frontward or rearward view of the connection face 66 of connection interface 26 as it is being moved along path 60. The front or rear view of connection interface 26 may be obtained by controller 50 from a stored front or rear image of interface 26, a previously captured front or rear image of interface 26 by an operator that is uploaded to controller 50 or from a web accessed server database containing front or rear images of connection interface 26. In such an implementation, the path 60 being presented generally extends in a two-dimensional substantially horizontal plane, whereas the connection face 66 extends in a generally vertical plane, generally orthogonal to the horizontal plane of path 60.

In the example illustrated, to further assist the operator in steering vehicle 24 so as to bring connection interfaces 26 and 36 into connection, controller 50 may generate presentation signals which cause presentation 159 to further provide visual alignment aids with respect to attachment 34 and its connection interface 36. In the example illustrated, controller 50 outputs present takes signals further causing visual presentation 159 to include attachment connection interface connector line 74. Connector line 74 corresponds to the connecting edge of connection interface 36 and has a width much greater than the width of connection interface 36. The connector line 74 may be in the form of a virtual bright line or other visible marking extending beyond the side edges of connection interface 36. Connector line 74 intersects connection points are 38 and assists the operator in determining the degree to which connection interface 36 and the connection points 38 are parallel to the connection interface 26 of vehicle 24 as connection interface 26 is moved towards attachment 34. In implementation were both lines 64 and 74 provided, the extended length of such lines assists the operator 32 in identifying whether interfaces 26 and 36 are parallel, or what steering changes need to be made to achieve a parallel relationship by visually evaluating the degree to which lines 64 and 74 are parallel.

In one implementation, controller 50 output presentation signals that further cause visual presentation 159 to include a front view of connection interface 36 and/or a portion of attachment 34 and its connection interface 36. The front image of connection interface 36 may be obtained from a camera facing connection interface 36. In one implementation, the front image may include or comprise a bright virtual line corresponding to the boundaries of connection interface 36, overlying the edges are boundaries of connection interface 36 and overlaid upon real-time image of connection interface 36, is captured by a camera maybe presented by visual presentation 159. The bright virtually impose line overlaid upon the actual boundaries are edges of the front view of connection interface 36, extending in a plane generally vertical plane may assist the operator 32 in aligning connection interfaces 26 and 36.

The vehicle 24 with its connection interface 26 and the attachment 34 with its connection interface 38, for which system 20 may be used to assist in guiding the operator during their connection, may comprise a variety of different vehicles and associated attachments. In one implementation vehicle 24 may comprise a harvester or combine while the attachment 34 comprises a header. In another implementation, vehicle 24 may a self-propelled forage harvester all attachment 34 comprises a header. In one implementation, vehicle 24 may comprise a self-propelled windrower while attachment 34 comprises a header or head. In one implementation, vehicle 24 may comprise a loader, skid steer or the like, wherein attachment 34 comprises a bucket, boom, forks, post digger, and the like (skid or ag or construction). In one implementation, vehicle 24 may comprise a backhoe, crawler, compact tractor, crawler track loader, excavator or the like connection to various attachments. In one implementation, vehicle 24 may comprise a tractor, wherein the attachment comprises a three-point hitch for a rear of the tractor or a three-point hitch for a front of the tractor. In one implementation, vehicle 24 may comprise self-propelled applicator, wherein attachment 34 comprises a sprayer boom or a sprayer tank and boom which are releasably connected or mounted to the vehicle 24. In yet another implementation, vehicle 24 may comprise a self-propelled applicator, while attachment 34 comprises a dry spreader box. In still another implementation, vehicle 24 may comprise a compact tractor, wherein attachment 34 comprises a belly mower. In implementations where the attachment comprises a belly motor, the connection interface may be inside the tires, wherein the total vehicle width which would be outside of tires.

Figure 3:
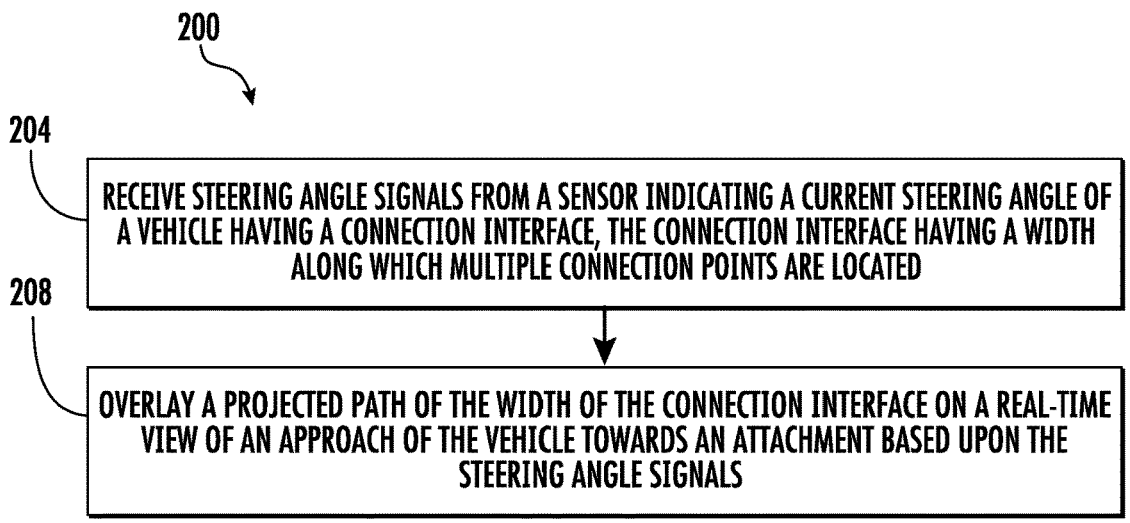
FIG. 3 is a flow diagram of an example vehicle connection guidance method.

FIG. 3 is a flow diagram of an example vehicle connection guidance method 200. Method 200 assists the operator in achieving a parallel relationship between the vehicle and the attachment when being connected to one another across multiple connection points. Although method 200 is described in the context of being carried out by system 20, it should be appreciated that method 200 may likewise be carried out with any of the systems, vehicles and attachments described in the disclosure as well as other similar systems, vehicles and attachments.

As indicated by block 204, a controller, such as controller 250, receives steering angle signals from a sensor, such as sensor 40, indicating a current steering angle of a vehicle comes edges vehicle 24, which has a connection interface, such as connection interface 36. The connection interface may have a width along which multiple connection points are located.

As indicated by block 208, based upon a provided or determined width of the control interface and the steering angles, controller 50 outputs presentation signals causing a projected path of the width of the connection interface to be overlaid on a real-time view of an approach of the vehicle towards an attachment. In one implementation, the projected path is overlaid upon the surrounding environment or terrain itself through which the vehicle is to move when moving towards the attachment. In another implementation, the projected path is overlaid upon a windshield or window through which an operator may be viewing the surrounding terrain or environment through which the vehicle is to move when moving towards the attachment. In another implementation, the projected path is overlaid upon a real-time captured image of the surrounding terrain or environment being presented on a display or monitor.

As described above, the method may comprise additional visual assists for the operator. For example, in addition to the overlaid path of the width of the connection interface, connection line 64 and/or line 74 may be overlaid upon the real-time view. In some implementations, a front or rear view of the front or rear face of connection interface 26 and/or connection interface 36 may be overlaid upon the real-time view.

Figure 4:
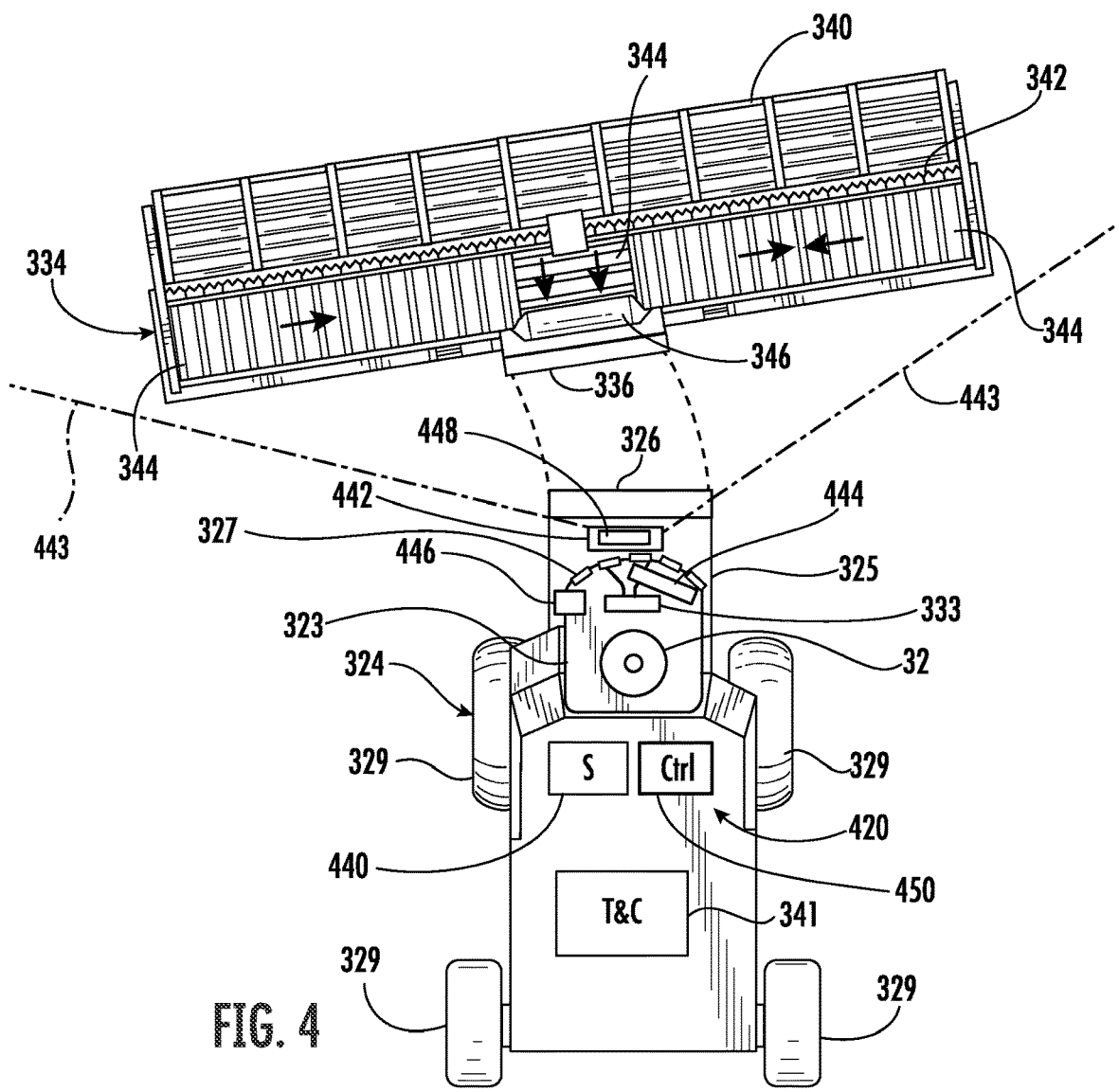
FIG. 4 is a top view schematically illustrating portions of an example vehicle connection guidance system for connecting an example harvester to an example header.

FIG. 4 is a top view illustrating portions of an example vehicle in the form of a harvester 324, to be attached to an example attachment, in the form of a header 334, wherein the harvester 324 is provided with an example vehicle connection guidance system 420. Harvester 324 comprises a self-propelled piece of agricultural equipment that is configured to gather and sever a crop from its growing medium and to thresh and clean grain of the crop. In the example illustrated, harvester 324 comprises a feeder house 325 having a connection interface 326, a threshing and cleaning system 341 (schematically shown) and a set of ground motive members in the form of wheels 329.

Feeder house 325 projects from a forward end of harvester 324 and supports connection interface 326 in the form of hooks, clevises or the like. Feeder house 325 is configured to be releasably connected to a corresponding connection interface 336 of header 334. Feeder house 325 receives crop material from header 334 and rearwardly conveys such crop material to threshing and cleaning system 341. Threshing and cleaning system 341 may comprise a rotor, a straw walker and/or a set of chafers or sieves for separating straw and chaff from grain, wherein the grain is filtered through the set of chafers or sieves and is temporarily stored in a grain tank.

Wheels 329 support and propel harvester 324 across a field. In one implementation, harvester 324 is a front wheel drive, wherein the front wheels 329 are driven by an internal combustion engine and associated transmission and wherein the rear wheels 329 are turned to steer harvester 324. In other implementations, harvester 329 may be steered in other manners.

In the example illustrated, harvester 324 is configured to be driven by an operator 32 seated within a cab 332 having a forwardly facing windshield 327. Cab 332 may include a steering wheel 333 by which the operator 32 may steer rear wheels 329 to steer harvester 324. In other implementation, harvester 324 may be remotely controlled by a remote operator 32 using wireless transceivers and remote controls. The remote location may include a steering wheel, joystick or steering interface.

Header 334 is releasably mountable to connection interface 326 and feeder house 325. In the example illustrated, header 334 comprises a rotatably driven reel 340 that gathers crops and an underlying cutter bar 342 that severs a crop from the growing medium. The severed and gathered crop material is then conveyed by draper belts 344 to a rotatably driven feeder or drum 346 which further moves the crop material into feeder house 325 for further conveyance to threshing and cleaning system 341. In other implementation, header 334 may have other configurations. For example, in other implementation, header 334 may be in the form of a corn row ahead having a series of row units, stalk rollers, stripper plates and conveying chains that gather ears of corn and convey the ears of corn towards feeder house 325. In still other implementation, header 334 may be configured to gather and sever other types of crops from respective growing mediums.

Vehicle connection guidance system 420 is similar to vehicle connection guidance system 20 described above in that vehicle connection guidance system 420 provides operator 32 with visual assists to facilitate the connection of a vehicle connection interface to an attachment connection interface. In the example illustrated, vehicle connection guidance system 420 provides visual assistance to in operator steering harvester 324 to align connection interface 326 at the front end of feeder house 325 to connection interface 336 at a rear end of header 334. Vehicle connection guidance system 420 comprises sensor 440, camera 442, monitor 444, windshield projector 446 and external projector 448 and controller 450.

Sensor 440 is similar to sensor 40 described above. Sensor 440 comprises at least one sensor supported by harvester 324. Sensor 440 is configured to output steering angle signals. In one implementation, sensor 440 comprises a sensor that detects the steering input provided by operator 32 such as rotation of steering wheel 333 or manipulation of another steering interface or a remote steering interface. In such an implementation, sensor 440 generates the steering angle signals based upon the detected steering input, wherein the steering angle signals are not only used by system 420 to guide the operator in providing additional steering input, but are also used to control the actuators, hydraulic pumps, motors, hydraulic transmissions or mechanical transmissions that maneuver the wheels 329 of the harvester 324 to achieve turning. In one implementation, sensor 440 may comprise a potentiometer that senses rotation of a steering column in response to turning of a steering wheel.

In other implementations, sensor 440 is distinct from a second sensor that detects steering input from operator 32 and that generates control signals for controlling the actuators that maneuver the wheels. In such an implementation, sensor 440 may sense the maneuvering of the wheels that result from the control signals generated by the second sensor. For example, in one implementation, sensor 440 may comprise a potentiometer that senses rotation or movement of a steering linkage or axle of wheels 329.

Camera 442 is carried by harvester 324 and is supported or oriented just to capture a terrain or environment in front of harvester 324 and in front of feeder house 325 as indicated by broken lines 443. Camera 442 captures a video or images of the terrain as well as images of the header 334 which is to be attached to harvester 324 with the assistance of system 420. In some implementations, harvester 324 may include multiple cameras at different angles, wherein the different captured images are merged or are selectable for viewing by operator 32.

Monitor 444 comprises a device for presenting the visual presentation presented by controller 450. Monitor 444 provides a display. In the example illustrated, monitor 444 is mounted within cab 323 for being viewed by the operator 32. In other implementations where the operator 32 remotely controls harvester 324, monitor 444 may also be located remote from harvester 324. In one implementation, monitor 444 additionally serves as an operator input device such as where monitor 444 comprises a touchscreen.

Windshield projector 446 comprises a device configured to project or otherwise cause a visual presentation to be displayed upon windshield 327. The visual presentation provided on windshield may be translucent, permitting the operator to concurrently view the visual presentation and the real world environment or terrain in front of harvester 324 through the visual presentation. In other implementations, such as where the visual presentation is comprised of relatively thin visible lines, the thin visible lines may be opaque, but wherein the thin visible lines do not substantially impair the operator's ability to comprehend the real world environment or terrain in front of harvester 324 as seen through windshield 327.

External projector 448 comprises a device that projects a visual presentation onto the terrain/ground in front of harvester 324 and/or onto rearwardly facing surfaces of header 334 as harvester 324 is approaching header 334. In one implementation, and external projector 448 may comprise a laser or a group of lasers that project visible beams of light onto the terrain/ground in front of harvester 324.

Controller 450 is similar to controller 50 described above. Controller 450 comprises an electronic device or component that outputs presentation signals based upon steering angle signals from sensor 440. Controller 50 comprises a processor 52 and a memory 54 (shown and described with respect to FIG. 1). The instructions contained in memory 54 direct processor 52 to receive the steering angle signals from sensor 40, to analyze the steering angle signals by evaluating the current angle being dictated for the steering wheel 329 and using the current angle to determine a current projected path 460 of harvester 324 and connection interface 326. The instructions contained in memory 54 further direct processor 52 to generate presentation signals based upon the determined path.

In the example illustrated, the instructions contained in memory 54 direct processor 52 to prompt or permit operator 32 to select from one of various modes for the display of the visual presentation generated by controller 450. In a first operator selected mode, controller 450 outputs control signals causing the generated visual presentation to be presented on monitor 444. In such an implementation, monitor 444 may present a live stream or images of the real-world terrain or environment in front of harvester 324 as captured by camera 442, wherein the visual presentation with the connection assists is overlaid upon the live stream or images of the real-world terrain or environment in front of harvester 324.

In a second operator selected mode, controller 450 outputs control signals causing windshield projector 446 to present the visual presentation generated by controller 450. In such an implementation, the real-world terrain or environment is seen through the windshield 327 while the visual presentation including the visual connection assists are present on windshield 327, effectively being overlaid on the real-world terrain or environment.

In a third operator selected mode, controller 450 outputs control signals causing external projector 448 to project the visual presentation with the connection assists generated by controller 50 directly upon the ground or terrain in front of harvester 324, wherein the visual presentation is overlaid upon the real world environment in front of harvester 324 as seen through windshield 327. In one implementation, controller 450 permits operator 32 to select multiple concurrent modes of operation such that the visual presentation with connection assists is concurrently presented by two or more of monitor 444, windshield projector 446 and external projector 448.

In some implementations, controller 450 may acquire images of the head 334 in front of harvester 320 from camera 442. In such an implementation, controller 1450 may analyze the captured images to identify the location of connection interface 336 of had 334. Such analysis may involve a wide variety of different image processing methods and their combinations (e.g. color histogram, intensity in region of interest, segmentation, background, subtraction, template alignment, pattern recognition via machine learning and deep learning, and the like). Upon identifying the location of connection interface 336, controller 450 may determine a recommended path of harvester 1324 for aligning and connecting connection interface 326 with connection interface 336. The recommended path may be a path that achieve such a parallelism and alignment in the shortest mount of time or that reduces relatively sharp turns of harvester 320. Controller 450 may then output control signals causing the recommended path to be concurrently presented with the current projected path for 60. In response to the steering of harvester 324 by the operator 32, the current projected path for 60 being presented will also change in real time. The operator may adjust the steering of harvester 324 such that the current projected path for 60 closely approximates or coincides with the recommended path also being presented. In such a manner, system may additionally guide the operator in aligning mount connection interface 326 of harvester 324 with connection interface 336 on head 334.

Figure 5:
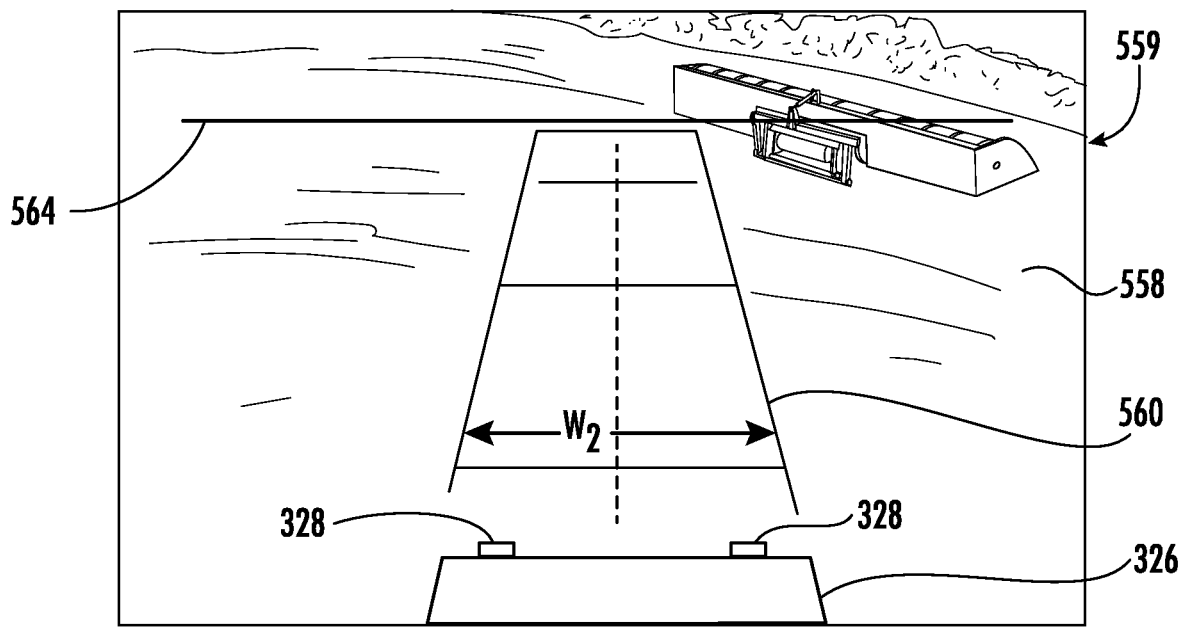
FIG. 5 is a diagram illustrating an example visual presentation presented by the example vehicle guidance system of FIG. 4.
Figure 6:
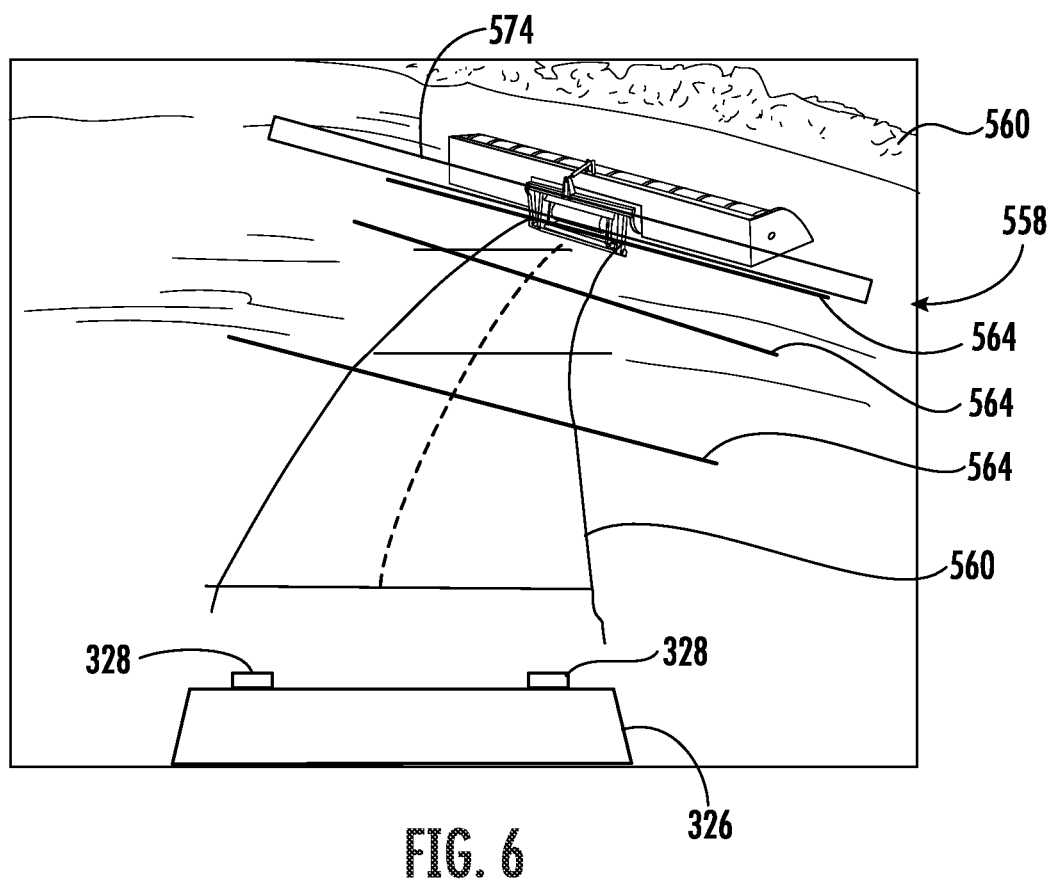
FIG. 6 is a diagram illustrating an example visual presentation presented by the example vehicle guidance system of FIG. 4.

FIGS. 5 and 6 illustrate an example of views of a visual presentation 559 that may be generated by controller 450 based upon steering angle signals received from sensor 440. As shown by FIGS. 5 and 6, the real-world view 558 serves as a background for the connection assists being presented. The real world view 558 may be an image of the real-world captured by camera 442 and presented on monitor 444 or may be the real world itself as seen directly through windshield 327, depending upon the user selected mode.

As further show by FIGS. 5 and 6, the visual presentation 559 includes multiple connection assists that are overlaid or projected onto the real world view 558. In the example illustrated, visual presentation 559 includes a projected path 560 of the width W2 of the connection interface 326 given the current steering angle signals indicating the current steering angle of harvester 324. In one implementation, the projected path presents an outline of the edges of the path, the edges being spaced apart by the width or proportional width of connection interface 326. By providing a visual presentation of a projected path 560 of the width W2 of the connection interface, encompassing both connection points 328 (in contrast to displaying the entire width of harvester 324), controller 450 provides a visual presentation that may better assist operator 32 in aligning the multiple connection points 428 to the corresponding multiple connection points of the connection interface of the header 334 to be connected to the harvester 324 and achieving a parallel relationship between the two connection interfaces of the vehicle and the attachment.

As further show by FIGS. 5 and 6, the presentation signals output by controller 450 may further cause the visual presentation 559 to further comprise at least a portion of the connection interface 326 itself at its current location and orientation. For example, in one implementation, the connection interface 326, in the form of a graphic representing the connection interface, may be depicted at the beginning of the path. In some implementations, the visual presentation may include an animation illustrating movement of the connection interface 326 along the path.

As described above, the shape and size of the connection interface 326 may be stored in memory 54 or elsewhere and used by controller 450 to generate the visual presentation of the connection interface 326. In some implementations, the shape and size of the connection interface 326 may be determined by controller 450 from an image of connection interface 326 as captured by camera 442. For example, camera 442 may be mounted at the front aimed down at the connection interface 326.

As shown by FIGS. 5 and 6, the visual presentation 559 of the projected path 560 has a width corresponding to or otherwise proportional to the width W2 of the connection interface 326. Controller 450 may obtain this width W2 from a prior value stored in memory 54. In another implementation, controller 450 may obtain width W2 by prompting operator 32 or another person to enter the width W2. In another implementation, controller 450, following instruction contained in memory 54, may wirelessly access a server database containing width W2, based upon an internal identifier are based upon an operator input identifier for connection interface 26 or vehicle 24.

In yet other implementations, controller 450 may prompt the operator or another person to capture an image of connection interface 326 using a smart phone or camera having an augmented reality application that determines a measurement based upon the captured image. For example, controller 450 may prompt the operator or another person to use the Iphone™ Measure app, wherein the measurements of the connection interface may be obtained and transmitted to controller 450 for determining the width and center of the path 560 that is displayed or projected. In another implementation, controller 50 may follow instruction contained memory 54 for identifying edges of a captured image of interface 326 to determine the shape and dimensions of the interface 326. In yet other implementations, controller 450 may use optical recognition to identify the particular connection interface 26 and thereafter obtain its measurements from an Internet server database resource.

In yet other implementations, the projected path 460 may be presented on display monitor 444 relative to a controller generated graphic representing the attachment and its connection interface. For example, in one implementation, camera 422 may capture an image of the current location and orientation of the attachment, wherein controller 450 then utilizes captured image to generate a graphical image that represents or corresponds to the current location and orientation of the attachment. In some implementations, the controller generated image of the attachment and its computer interface may be generated based upon signals from sensors associated with the attachment and/or its connection interface.

In the example illustrated, the presentation signals output by controller 450 cause the visual presentation 559 to further include connection assists in the form of a series of connector lines 564 which corresponds to the connecting edge of connection interface 26 at different points in time during movement along the current path or trajectory, wherein each of the connector lines 564 has a width much greater than the width of connection interface 326. The connector lines 564 may be in the form of a virtual bright line or other visible marking extending beyond the side edges of connection interface 326. Connector lines 564 assist the operator in determining the degree to which connection interface 326 is parallel to the connection interface 336 of header 334 as connection interface 326 is moved towards header 334.

As shown by FIG. 6, to further assist the operator in steering harvester 324 (shown in FIG. 4) so as to bring connection interfaces 326 and 336 into an aligned and parallel relationship, controller 450 may generate presentation signals which cause presentation 559 to further provide visual alignment aids with respect to header 334 and its connection interface 336. In the example illustrated, controller 450 outputs presentation that further cause visual presentation 559 to include attachment connection interface connector line 574. Connector line 574 corresponds to the connecting edge of connection interface 336 and has a width much greater than the width of connection interface 336. The connector line 574 may be in the form of a virtual bright line or other visible marking extending beyond the side edges of connection interface 336. Connector line 574 intersects connection points of interface 336 and assists the operator in determining the degree to which connection interface 336 and the connection points are parallel to the connection interface 326 of harvester 324 as connection interface 326 is moved towards header 334. In implementation were both lines 564 and 574 provided, the extended length of such lines assists the operator 32 in identifying whether interfaces 326 and 336 are parallel, or what steering changes need to be made to achieve a parallel relationship by visually evaluating the degree to which lines 564 and 574 are parallel.

Figure 7:
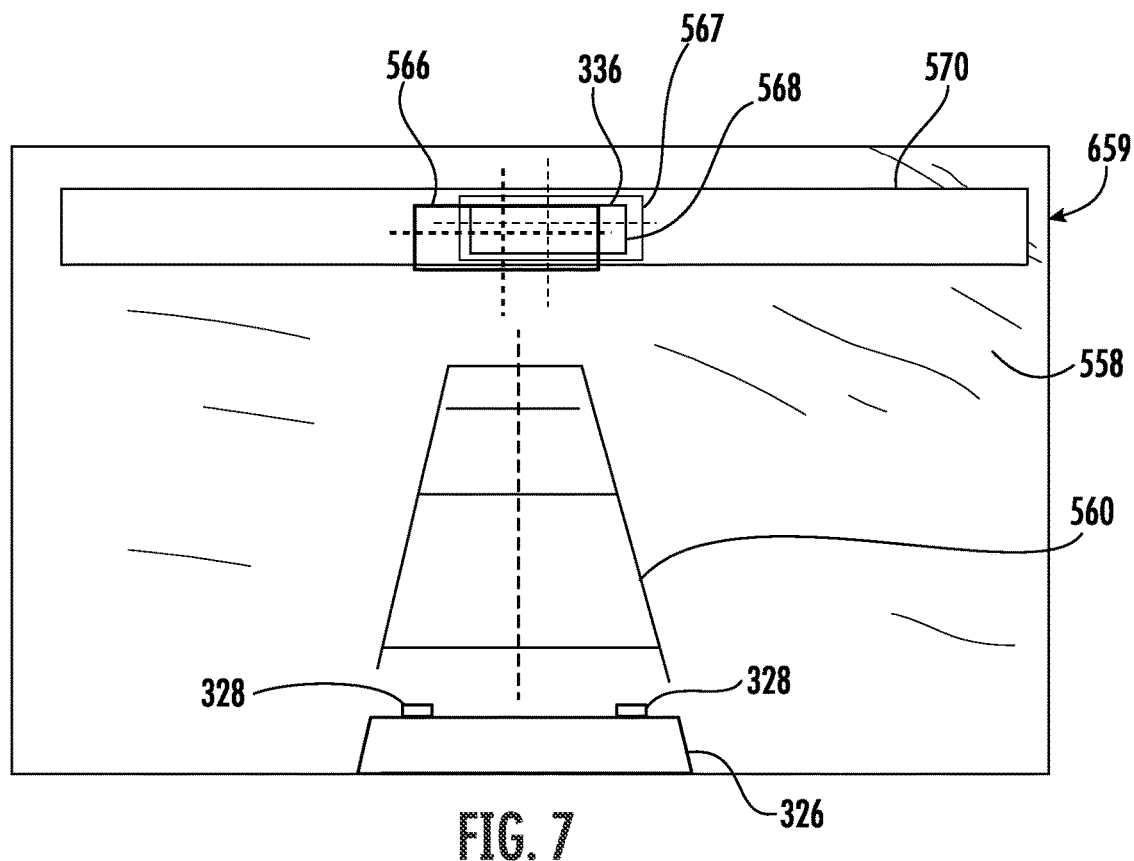
FIG. 7 is a diagram illustrating an example visual presentation presented by the example vehicle guidance system of FIG. 4.
Figure 8:
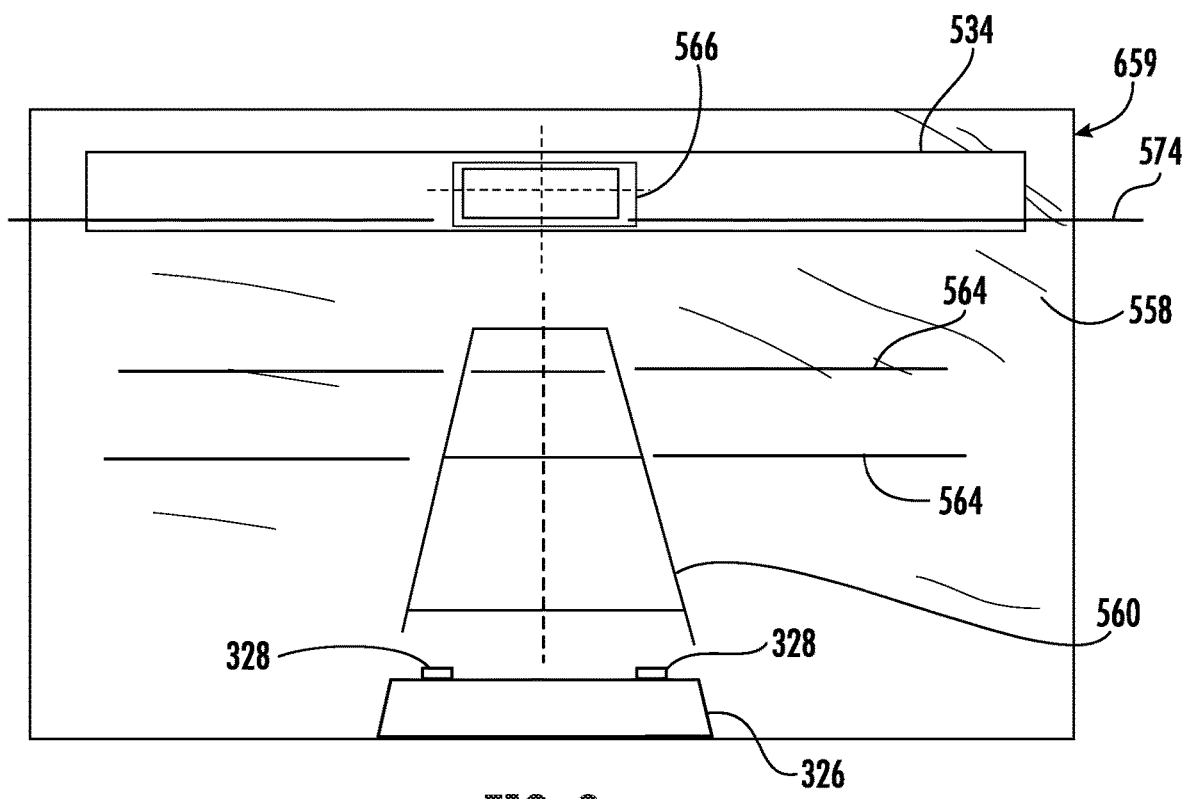
FIG. 8 is a diagram illustrating an example visual presentation presented by the example vehicle guidance system FIG. 4.

FIGS. 7 and 8 illustrate an example of views of a visual presentation 659 that may be generated by controller 450 based upon steering angle signals received from sensor 440. Visual presentation 659 is similar to visual presentation 559 described above except that visual presentation 659 includes additional visual aids for assisting the operator in aligning connection interfaces 326 and 336. As shown by FIGS. 7 and 8, controller 450 outputs control signals to depict or represent a frontward or rearward view of the connection face 566 of connection interface 326 as it is being moved along path 560. The front or rear view of connection interface 326 may be obtained by controller 450 from a stored front or rear image of interface 326, a previously captured front or rear image of interface 326 by an operator that is uploaded to controller 450 or from a web accessed server database containing front or rear images of connection interface 326. The positioning and orientation of the depicted connection face 566 is determined by controller 450 based upon steering angle signals received from sensor 440. In such an implementation, the path 560 being presented generally extends in a two-dimensional substantially horizontal plane, whereas the connection face 566 extends in a generally vertical plane, generally orthogonal to the horizontal plane of path 560.

In the example illustrated, controller 550 further generates control signals causing the visual presentation being generated to include a target positioning outline 567, wherein outline 567 is an outline of connection interface 326 when aligned with respect to connection interface 336. The outline 567 is overlaid on either a real-time rear view of the rear face of header 334 or graphical representation or highlighting of header 334. As a result, the operator may more easily achieve precise connection of interfaces 326 and 336 by steering harvester 324 to align the depicted connection face outline 566 with the target positioning outline 567.

In one implementation, controller 450 outputs presentation signals that further cause visual presentation 659 to include a front view of connection interface 336 and/or a portion of header 334 and its connection interface 336. The front image of connection face 568 may be obtained from camera 442 facing connection interface 336. In the example illustrated, the connection face 568 may include or comprise a bright virtual line corresponding to the boundaries of connection interface 336, overlying the edges or boundaries of connection interface 336 and overlaid upon real-time image of connection interface 336, as captured by camera 442. The bright virtually imposed line is overlaid upon the actual boundaries or edges of the front view of connection interface 336, extending in a plane generally vertical plane may assist the operator 32 in aligning connection faces 566 and 568 (shown aligning 8) to assist in the connection of interfaces 326 and 336.

In the example illustrated, controller 550 further applies edge boundary detection image analysis to identify the edges of the rear face of header 334, wherein the rear face of header 334 is either graphically represented or optically highlighted as represented by the rear depiction 570 of header 334. The graphical representation or optical highlighting of the rear face of header 334, from which connection interface 336 extends may further assist in ensuring parallelism with respect to connection interfaces 326 and 336.

Figure 9:
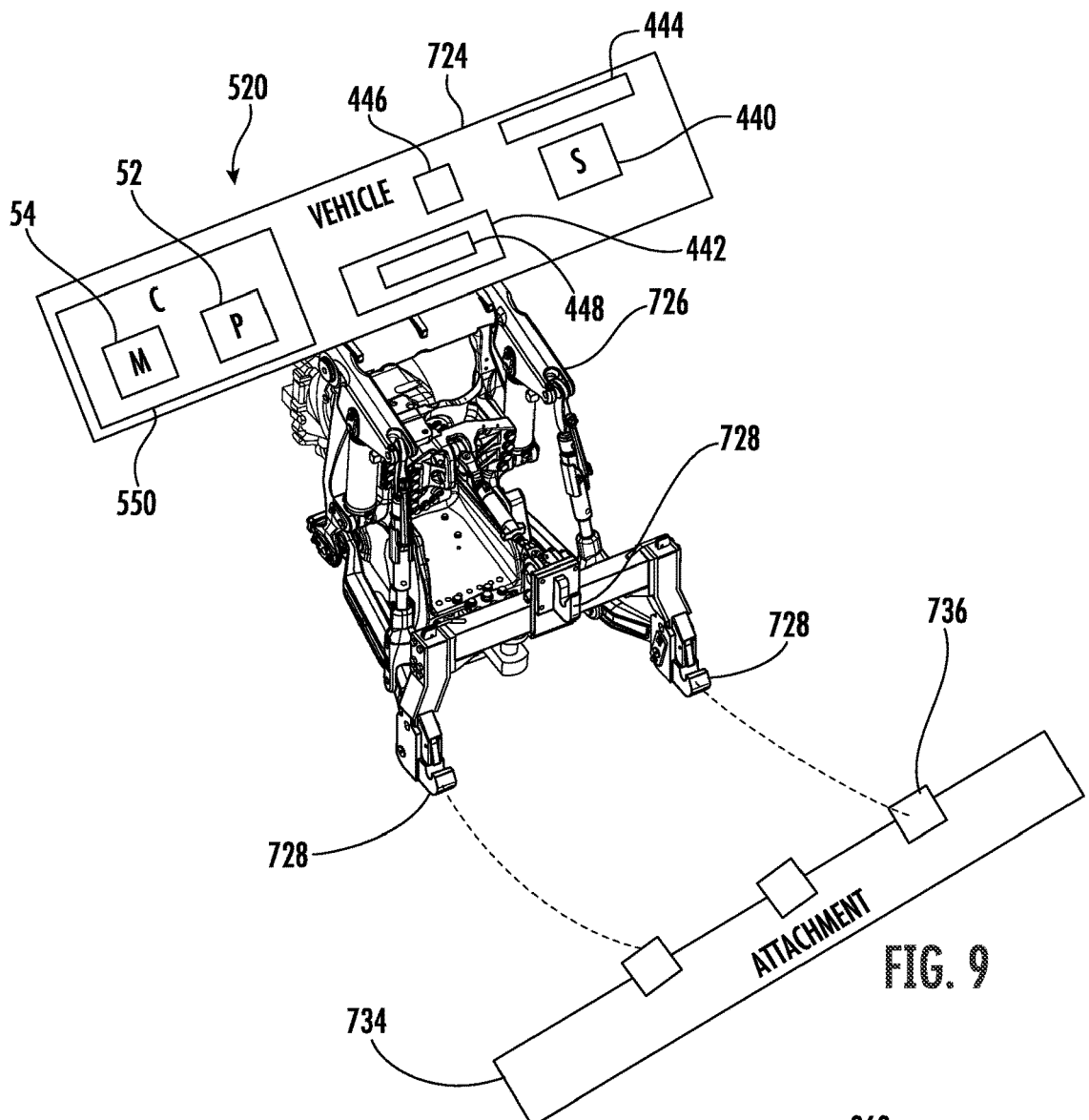
FIG. 9 is a perspective view schematically altering portions of an example vehicle connection guidance system for connecting an example 3 point hitch with an example attachment.

FIG. 9 is a perspective view illustrating portions of an example vehicle 724, such as a tractor, having an example interface in the form of a three-point hitch 726 which is to be connected to a three-point hitch connection interface 736 of an attachment 734 (schematically illustrated). Three-point hitch 726 may extend along the front of vehicle 724 or along the rear of vehicle 724. Three-point hitch 726 provides three spaced connection points 728, triangularly spaced from one another. FIG. 9 further illustrates vehicle 724 equipped with a vehicle connection guidance system 720.

Vehicle connection guidance system 720 is similar to vehicle connection guidance system 520 described above except that the components of system 520 are carried by vehicle 724 rather than harvester 324. In implementations where vehicle 724 comprises a tractor, windshield projector 446 projects the visual representation onto front or rear windshield of the tractor. As described above, system 520 may be operable in various different modes, wherein the visual representation may be depicted on the windshield of the vehicle 724, may be presented on monitor 444 or may be directly projected onto the surrounding terrain by projector 448.

Figure 10:
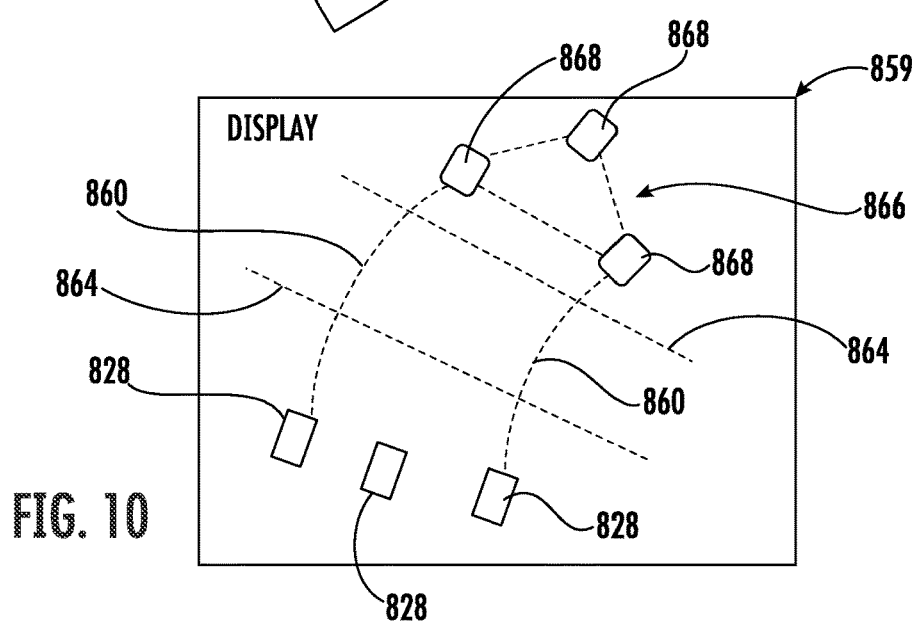
FIG. 10 is a diagram illustrating an example visual presentation presented by the example vehicle guidance system FIG. 9.

FIG. 10 illustrates an example visual representation 859 which may be generated by controller 550. In the example illustrated, visual representation 859 is presented on monitor 444. In other implementations, the visual represented 859 may be depicted on the windshield and/or directly on the terrain underlying the path of travel of three-point hitch 726 as it is being moved towards attachment 734.

In the example illustrated, visual representation 859 includes a graphic representation 828 of the three hitch points 728 of three-point hitch 726. Visual representation 859 further comprises a projected path 860 of the outermost connection points 828 of the three-point hitch 726 and interface connection lines 864 which are to intersect the projected or estimated location of connection points 828 as they are moved along path 860. Interface connection lines 864 have a length greater than the distance separating the outermost connection points 828 (similar to connection lines 564 described above). In addition, visual representation 859 further includes a front view or connection face 866 of the connection interface 726 with graphically represented connection points 868 corresponding to connection points 828. Each of the visual connection assists 828, 860, 864 and 866 assist the operator and steering vehicle 724 to achieve and aligned and parallel relationship between the connection points 728 of three-point hitch 726 and the corresponding three triangularly located connection points 736 of attachment 734.

II. Vehicle Attachment Carrier Loading Guidance System

Disclosed are example vehicle attachment carrier loading guidance systems and methods that assist in operator the operator in loading and connecting a vehicle attachment onto an attachment carrier. Disclosed are example vehicle attachment carrier loading guidance systems and methods that assist the operator in achieving a parallel relationship between the vehicle attachment and the attachment carrier when being connected to one another. The example vehicle attachment carrier loading guidance systems and methods are especially well suited to assist in the loading of an attachment in the form of a harvester header onto an attachment carrier in the form of a trailer.

In some implementations, the vehicle attachment carrier (VAC) loading guidance system (LGS) assists the operator by providing a projected path of the mount interface of the vehicle attachment with respect to the mount of the VAC as the vehicle and the carried attachment approach the VAC. In some implementations, the VAC LGS assist the operator by overlaying a representation of the mount interface of the vehicle attachment onto a real-world or real-time view of the vehicle attachment as the vehicle and the vehicle attachment approach the VAC. In some implementations, the VAC LGS provides an augmented reality, one in which the otherwise concealed or at least partially concealed mount interface of the vehicle attachment is overlaid or presented on the real-time real world view of the vehicle attachment. In some implementations, the VAC LGS provides an augmented reality, one in which the otherwise concealed or at least partially concealed mount of the carrier is overlaid or presented on the real-time real world view of the carrier. As a result, the operator may better align the mount interface of the vehicle attachment to the mount of the VAC. In some implementations, a larger guidance system may encompass both the above described vehicle connection guidance system and the following described VAC LGS.

Disclosed an example VAC LGS that may include a sensor for being supported by vehicle supporting a removable attachment having a mount interface for interacting with a mount on an attachment carrier distinct from the vehicle, wherein the sensor is output steering angle signals. The system may further comprise a controller to output presentation signals based upon the steering angle signals.

The presentation signals are to generate a visual representation of a projected path of the mount interface with respect to the mount.

Disclosed is an example VAC loading guidance method. The method may include receiving steering angle signals from a sensor indicating a current steering angle of a vehicle having a removable attachment having a mount interface for interacting with a mount on an attachment carrier that is distinct from the vehicle. The method may further include overlaying a projected path of the mount interface on a real-time view of an approach of the vehicle towards the attachment carrier based upon the steering angle signals.

Disclosed is an example harvester. The harvester may comprise a feeder house, a header mount interface proximate the feeder house and a header removably mounted to the feeder house by the header mount interface. The header may have a mount interface for securing the header to a trailer. There are certain may further include a VAC LGS that may comprise a sensor to output steering angle signals indicative of a steering angle of the harvester during an approach of the harvester carrying the header towards the trailer and a controller to output control signals causing the display to overlay a representation of the mount interface on a real-time view of the approach.

Disclosed is an example VAC LGS that augments a real-world, real-time view of a vehicle and attachment approach an attachment carrier with a depiction or representation of a mount interface of the vehicle attachment. The VAC LGS may be especially beneficial when incorporated into a harvester, such as the above described harvester. The VAC LGS may carry out a method that involves the augmentation of a real-world real-time view of the vehicle and its removable attachment with the depiction or representation of the mount interface as the vehicle and attachment approach and attachment carrier.

In some implementations, the real world, real-time view of the vehicle and attachment may be captured by a camera and presented on a display for viewing by an operator. In other implementations, the real world, real-time view of the vehicle and attachment may be seen by an operator looking through a transparent panel, window or the like, wherein the depiction or representation of the mount interface of the vehicle attachment is projected or otherwise presented on the transparent window or panel. In some implementations, the real world, real-time view of the vehicle attachment may be the vehicle and attachment itself as seen by the operator, wherein the depiction or representation of the mount interface of the vehicle attachment is projected directly onto the vehicle attachment. Such an augmentation of the real-world real-time view of the vehicle attachment with the representation of the attachment's mount interface, may assist the operator in operating and aligning the vehicle attachment with the attachment carrier in circumstances where the actual mount interface underlies the vehicle attachment or is otherwise difficult for the operator to see.

The augmentation of the real-world real-time view of the vehicle attachment with the representation of the attachment's mount interface may further offer greater design flexibility for the vehicle, attachment carrier and/or the vehicle attachment itself. Because such augmentation reduces reliance upon the operator being able to see or view the mount interface of the attachment when loading the attachment onto the attachment carrier, the mount interface and the mount on the attachment carrier may be located at a greater number of locations which may or may not offer visibility of the mount or mount interface. This greater flexibility after the location of the mount and/or mount interface may facilitate the design of an attachment carrier, vehicle attachment or vehicle that is more compact or that provides other design benefits. Such an augmentation may be used with or without the above described depiction of the path of the mount interface with respect to the mount.

Figure 11:
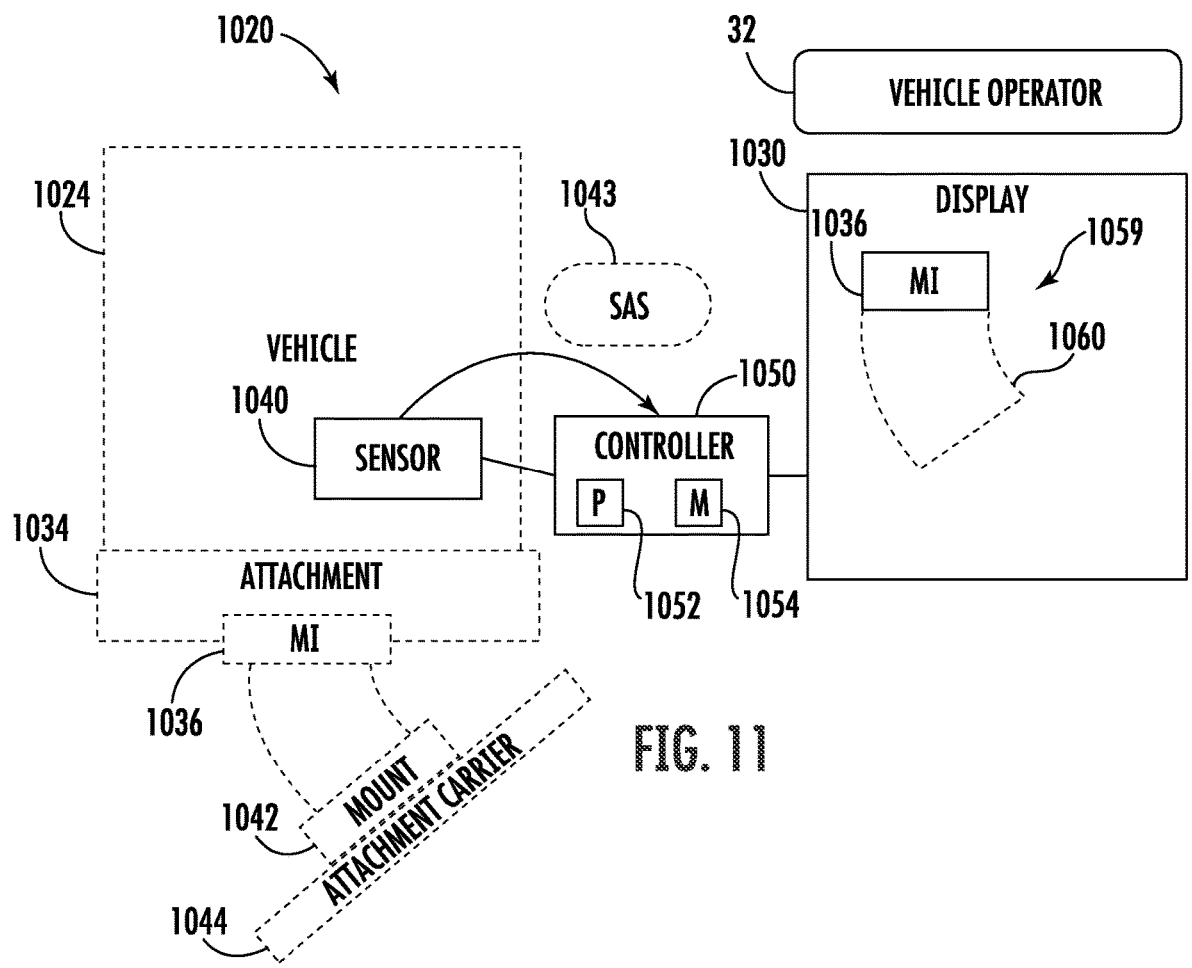
FIG. 11 is a block diagram schematically illustrating portions of an example vehicle attachment carrier loading guidance system.

FIG. 11 is a block diagram schematically illustrating portions of an example VAC LGS 1020. System 1020 guides and assists an operator in loading a vehicle attachment carried by a vehicle onto an attachment carrier. System 1020 is configured for use with a vehicle 1024 and a removable vehicle attachment 1034.

In one implementation, vehicle 1024 comprises a vehicle that is steerable through different actuation of ground engaging or motive members, such as wheels or tracks. In one implementation, the steering or turning of the vehicle is achieved through the output of control signals from a controller causing the different actuation of pumps, motors or mechanical or hydraulic transmissions which cause different ground engaging members on different sides of the vehicle to travel or be driven at different speeds. Such control signals may be generated in response to operator input, such as a turning of the steering wheel, movement of a joystick or on either input provided by an operator 32. In yet other implementations, the operator input controlling the turning of the vehicle may be directly transmitted by a steering transmission to the ground engaging or motive members, with or without power assist.

Vehicle attachment 1034 comprises a device or structure that is removably or releasably attached to vehicle 1024. For purposes of this disclosure, the term "releasably" or "removably" with respect to an attachment or coupling of two structures means that the two structures may be repeatedly connected and disconnected to and from one another without material damage to either of the two structures or their functioning. Vehicle attachment 1034 carries out selected functions attachment 1034 may be removed from vehicle 1024 and replaced with a different attachment for carrying out a different function. In one implementation, vehicle test 1034 is cantilevered from vehicle 1024. In another implementation, vehicle attachment 1034 comprise wheels, skis or other supporting structures.

One example of such a vehicle attachment 1034 is a head on a combine harvester. Removal of one head, such as a corn head, facilitates the use of the harvester with a different head, such as a head having a configuration for parsing wheat, oats, soybeans or other grains. Such heads are often extremely wide, too wide for a road or highway. As a result, such heads are often detached from the harvester and loaded, in a lengthwise fashion, onto a trailer for transport.

As schematically shown by FIG. 11, vehicle attachment 1034 comprises a mount interface 1036. Mount interface 1036 comprises a structure that interacts with a corresponding mount 1042 of an attachment carrier 1044. Mount interface 1036 provides enhanced securement of the attachment to the carrier. Such mounts may be in the form of cradles, projections, cavities or the like that receive, project into, interlock or otherwise interact with corresponding mount interfaces provided on the attachment.

As schematically shown by FIG. 11, system 20 is also configured for use with a display 1030. The display 1030 may comprise a monitor or other screen device present a visual image. The display 1030 may be mounted to and carried by vehicle 1024 for viewing by an operator 32 riding vehicle 1024. In other implementations, the display 1030 may be at a location remote from vehicle 1024, wherein the operator 32, also remote from vehicle 1024, remotely controls vehicle 1024.

System 1020 may be incorporated into vehicle 1024 or provided as part of a system with vehicle 1024 at the time that vehicle 1024 is initially implemented and used following manufacture. In other implementations, system 1020 may be provided as an add-on or aftermarket addition for use with an existing vehicle 1024. In some implementations, display 1030 may be provided as part of the system added to the existing vehicle 1024. System 1020 comprises sensor 1040 and controller 1050.

Sensor 1040 comprises at least one sensor supported by vehicle 1024. Sensor 1040 is configured to output steering angle signals. In one implementation, sensor 1040 comprises a sensor that detects the steering input provided by operator 32 such as rotation of a steering wheel, movement of a joystick or the like. In such an implementation, sensor 1040 generates the steering angle signals based upon the detected steering input, wherein the steering angle signals are not only used by system 1020 to guide the operator in providing additional steering input, but are also used to control the actuators, hydraulic pumps, motors, hydraulic transmissions or mechanical transmissions that maneuver the ground engaging or motive members of the vehicle to achieve turning. In one implementation, sensor 1040 may comprise a potentiometer that senses rotation of a steering column in response to turning of a steering wheel.

In yet other implementations, sensor 1040 is distinct from a second sensor that detects steering input from operator 32 and that generates control signals for controlling the actuators that maneuver the ground engaging members. In such an implementation, sensor 1040 may sense the maneuvering of the ground engaging members that result from the control signals generated by the second sensor. For example, in one implementation, sensor 1040 may comprise a potentiometer that senses rotation or movement of a steering linkage or axle of a wheel of vehicle 1024.

Controller 1050 comprises an electronic device or component that outputs presentation signals to display 1030 based upon steering angle signals 1043 from sensor 1040. Controller 1050 comprises a processor 1052 and a memory 1054. Processor 1052 carries out instructions contained in memory 1054. Memory 1054 stores such instructions and may be in the form of software programmed code. In other implementations, memory 1054 may be in the form of an integrated circuit, wherein the instructions are in the form of an architecture of various logic components. The instruction contained in memory 1054 directs processor 1052 to receive the steering angle signals 1043 from sensor 1040, to analyze the steering angle signals 1043 by evaluating the current angle being dictated for the ground motive members and using the current angle to determine a path of vehicle 1024 and connection interface 1026. The instructions contained in memory 1054 further direct processor 1052 to generate presentation signals based upon the determined path.

The presentation signals cause display 1030 to generate a visual presentation 1059 comprising a projected path 1060 of the width of the mount interface 1036 to operator 32 given the current steering angle signals indicating the current steering angle of vehicle 1024. In one implementation, the projected path presents an outline of the edges of the path, the edges being spaced apart by the width or proportional width of mount interface 1036. By providing a visual presentation of a projected path 1060 of the width W of the mount interface, (in contrast to displaying the entire width of vehicle 1024), controller 50 provides a visual presentation that may better assist operator 32 in aligning the mount interface of the attachment to be connected to the mount 1042 of attachment carrier 1044 and achieving a parallel relationship between the mount interface 1036 and the mount 1042.

As shown by FIG. 1, in some implementations, the presentation signals output by controller 1050 may further cause the generation of a visual presentation 1059 that further comprises at least a portion of the mount interface 1036 itself at its current location and orientation. For example, in one implementation, a graphic representing the mount interface 1036 may be depicted at the beginning of the path. In some implementations, the visual presentation may include an animation illustrating movement of the mount interface 1036 along the path.

In such an implementation, the shape and size of the mount interface 1036 may be stored in memory 1054 or elsewhere and used by controller 1050 to generate the visual presentation of the mount interface 1036. In some implementations, the shape and size of the mount interface 1036 may be determined by controller 1050 from an image of mount interface 1036 as captured by a camera carried by vehicle 1024. For example, a camera may be mounted at the front aimed down at the mount interface 1036. In the case of a vehicle attachment 1034 carried by vehicle 1024 at a rear of vehicle 1024, a camera may be mounted at a rear of vehicle 1024 and aimed down at the mount interface 1036. The same camera may be used to capture an image of the mount interface such as when the visual presentation 1059 includes a depiction of the mount interface 1036. In other implementations, the presentation signals may cause display 1030 to present just the path10 60 of mount interface 1036 without mount interface 1036, wherein the width of the path corresponds to the width of the mount interface 1036.

As shown by FIG. 1, the visual presentation 1059 of the projected path 1060 has a width corresponding to or otherwise proportional to the width W of the mount interface 1036. Controller 1050 may obtain this width W from a prior value stored in memory 1054. In another implementation, controller 1050 may obtain width W by prompting operator 32 or another person to enter the width W. In another implementation, controller 1050, following instruction contained in memory 1054, may wirelessly access a server database containing width W, based upon an internal identifier or based upon an operator input identifier for mount interface 1036 or vehicle 24.

In yet other implementations, controller 1050 may prompt the operator or another person to capture an image of mount interface 1036 using a smart phone or camera having an augmented reality application that determines a measurement based upon the captured image. For example, controller 1050 may prompt the operator or another person to use the Iphone™ Measure app, wherein the measurements of the mount interface may be obtained and transmitted to controller 1050 for determining the width and center of the path 1060 that is displayed or projected. In another implementation, controller 1050 may follow instruction contained memory 1054 for identifying edges of a captured image of interface 1036 to determine the shape and dimensions of the interface 1036. In yet other implementations, controller 1050 may use optical recognition to identify the particular mount interface 1036 and thereafter obtain its measurements from an Internet server database resource. In each of such cases, system10 20 may be utilized with any of a variety of different vehicle attachments 1034 having different mount interface 1036. Given the determined center of mount interface 1036, its determined width, and the current angle of the ground engaging motive members (wheels or tracks) from the steering angle sensor 1043, controller 1050 may determine and generate the path 1060.

In one implementation, the visual presentation of the projected path 1060 is overlaid upon a real-time camera captured image of the terrain or surroundings across or through which mount interface 1036 will be moved as it travels along the determined future path. The camera captured image serves as a background on display 1030 for the projected path 1060.

In yet other implementations, the projected path 1060 may be presented on display 1030 relative to a controller generated graphic representing the attachment and its mount interface. For example, in one implementation, vehicle 1024 may comprise a camera that captures an image of the current location and orientation of the attachment, wherein controller 1050 then utilizes captured image to generate a graphical image that represents or corresponds to the current location and orientation of the attachment. In some implementations, the controller generated image of the attachment and its computer interface may be generated based upon signals from sensors associated with the attachment and/or its mount interface.

In one implementation, system 1020 may be operable in various different modes selectable by the operator or based upon lighting conditions, wherein each mode presents the visual presentation of the projected path 1060 in a different manner. In one mode, the visual presentation of the projected path 1060 may be presented to the operator 32 and multiple concurrent manners. For example, in one mode of operation, controller 1050 may output presentation signals which are to cause a projector carried by vehicle 1024 to project the visual presentation of the projected path 1060 directly onto the surrounding terrain or environment, wherein the operator 32 may see the projected path 1060 directly on the surrounding terrain or environment. In one implementation, the projection of the projected path 1060 may be illuminated by a laser or other illumination system carried by vehicle 1024 and operated under the control of controller 1050.

In yet another mode of operation, controller 1050 may output presentation signals which are to cause a projector carried by vehicle 1024 to project the visual presentation of the projected path 60 onto a windshield or window of vehicle 1024 through which the operator 32 views the surrounding terrain or environment. In some implementations, the operator may select a mode where the projected path 1060 is concurrently presented on display 1030 and directly projected onto the surrounding terrain or environment through which vehicle 1024 is to move during connection to the attachment. In yet other implementations, display 30 may be incorporated as part of the window or windshield, wherein the presentation signals output by controller 1050 cause the window or windshield to incorporate display 1030 to generate a visual presentation of the projected path 1060.

Figure 12:
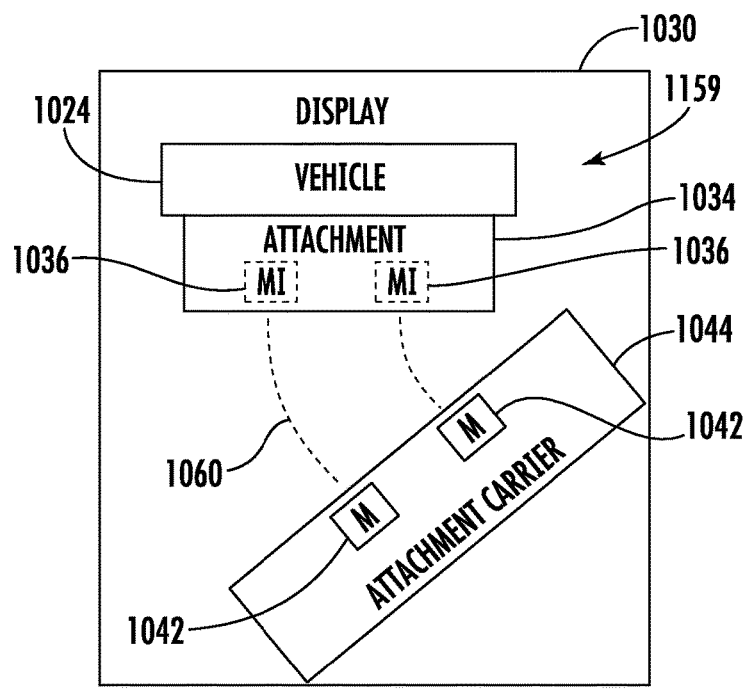
FIG. 12 is a diagram illustrating an example visual presentation presented by the example vehicle attachment carrier loading guidance system of FIG. 11.

In the example illustrated in FIG. 1, the mount interface 1036 of vehicle 1024 is to be moved, forwardly or rearwardly, into connection with a corresponding mount 1042 to facilitate connection to the associated attachment carrier 1044. FIG. 12 illustrates another example of a visual presentation 1159 that may be presented on display 30, that may be presented on the windshield or that may be projected onto the actual terrain/environment in response to the presentation signals output by controller 50. In the example illustrated in FIG. 12, the visual presentation 1159 not only includes a visual presentation of the projected path 1060 of the mount interfaces 1036, but additionally includes a depiction of the attachment 1034 itself, and at least portions of vehicle 1024. In some implementations, visual presentation 1159 additionally includes a depiction of the attachment carrier 1044 and its mounts 1042.

Figure 13:
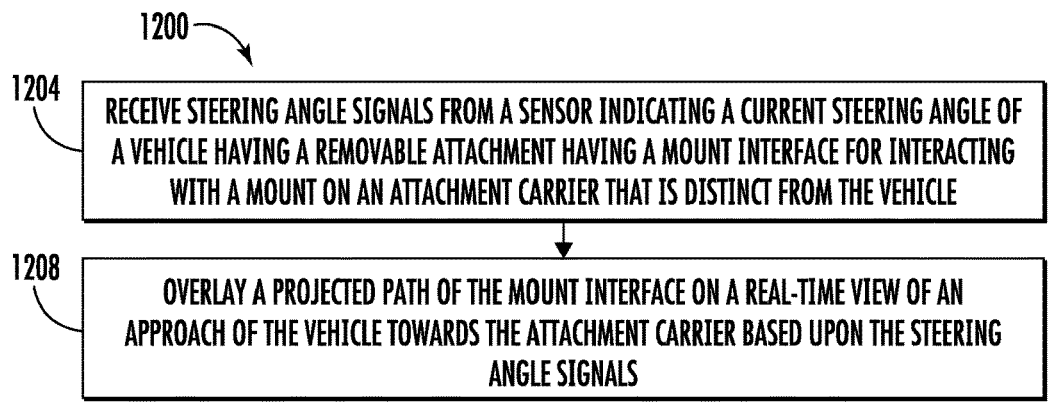
FIG. 13 is a flow diagram of an example vehicle attachment carrier loading's guidance method.

FIG. 13 is a flow diagram of an example vehicle attachment carrier loading guidance method 1200. Method 1200 assists the operator in achieving a parallel relationship between the attachment and the attachment carrier. Although method 1200 is described in the context of being carried out by system 1020, it should be appreciated that method 1200 may likewise be carried out with any of the systems, vehicles and attachments described in the disclosure as well as other similar systems, vehicles and attachments.

As indicated by block 1204, a controller, such as controller 1050, receives steering angle signals from a sensor, such as sensor 1040, indicating a current steering angle of a vehicle comes edges vehicle 1024, which has a removable attachment, such as attachment 1034, having a mount interface, such as mount interface 1036, for interacting with a mount, such as mount 1042, on an attachment carrier, such as attachment carrier 1044 that is distinct from the vehicle.

As indicated by block 1208, based upon a provided or determined width of the mount interface 1036 and the steering angles, controller 1050 outputs presentation signals causing a projected path of the width of the mount interface to be overlaid on a real-time view of an approach of the vehicle and carried attachment towards an attachment carrier. In one implementation, the projected path is overlaid upon the surrounding environment or terrain itself through which the vehicle is to move when moving towards the attachment carrier. In another implementation, the projected path is overlaid upon a windshield or window through which an operator may be viewing the surrounding terrain or environment through which the vehicle is to move when moving towards the attachment carrier. In another implementation, the projected path is overlaid upon a real-time captured image of the surrounding terrain or environment being presented on a display or monitor.

Figure 14:
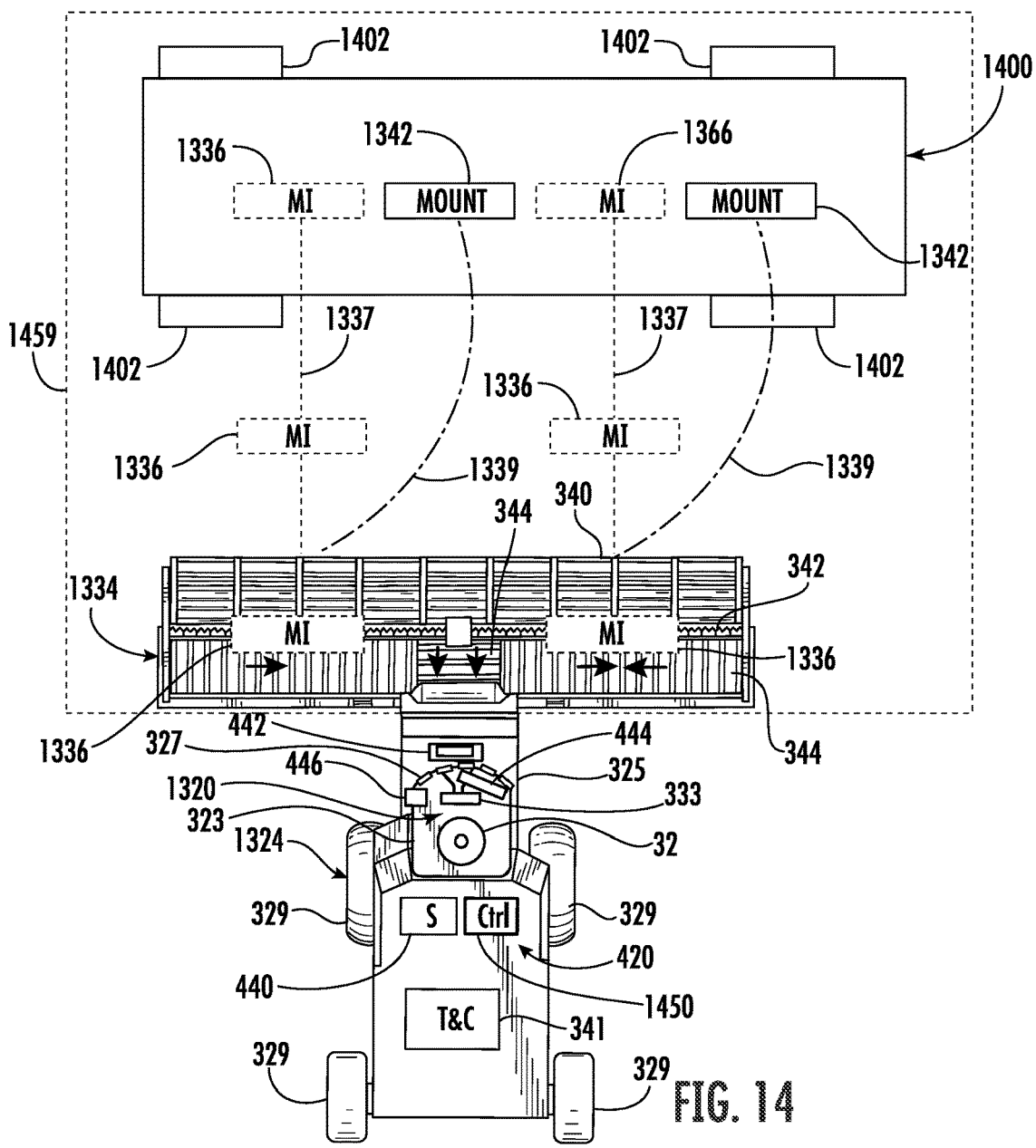
FIG. 14 is a top view schematically illustrating portions of an example vehicle attachment carrier loading guidance system for loading an example attachment onto an example carrier.

FIG. 14 is a top view illustrating portions of harvester 1324 removably attached to and carrying head 1334. Harvester 1324 is similar to harvester 324 described above except that harvester 1324 additionally comprises VAC LGS 1320 which is for use with head 1334 having mount interfaces 1336 and assists with loading header 1334 onto an attachment carrier in the form of a trailer. The remaining components of harvester 1324 which correspond to components of harvester 324 are numbered similarly or are shown in FIG. 4, and/or are described above.

Head 1334 is similar to head 334 described above except that had 1334 is specifically illustrated as additionally comprising a pair of mount interfaces 1336 (schematically shown) for interacting with corresponding mounts of attachment carrier 1400. Although head 1334 is illustrated as a draper head, it should be appreciated that head 1334 may comprise a corn head or other similarly configured heads for use with harvester 1324.

Attachment carrier 1400 is configured to carry head 1334 during transport. In the example illustrated, attachment carrier 1400 comprises a trailer that is configured to be pushed or pulled by vehicle, such as harvester 1324 or via different vehicle such as a truck, tractor or other self-propelled vehicle. In other implementations, attachment carrier 1400 may comprise a head carrying platform or bed of a vehicle itself. In the example illustrated, attachment carrier 1400 comprises wheels 1402 removably supporting attachment carrier 1400 over a terrain. To retain a loaded head, such as head 1334, attachment carrier 1400 additionally comprises mounts 1342 (schematically illustrated).

Mounts 1342 and mount interface 1336 cooperate to secure and retain head 1334 in place upon attachment carrier 1400 during transport of head 1334. Mounts 1342 and mount interfaces 1336 may be in the form of cooperating cradles, projections, cavities or the like that receive, project into, interlock or otherwise interact with one another. In an example implementation, mounts 1342 comprise depressions or cavities receive corresponding downward projections to inhibit or limit horizontal movement of the overlying head 1334 relative to the underlying attachment carrier 1400. In an example implementation, mounts 1342 may comprise bars, rods or the like while mount interfaces 1336 comprise corresponding hooks that catch up on the bars or rods when engaged. Such interactions may limit both horizontal and vertical movement of head 1334 relative to carrier 1400. In some implementations, mounts 1342 and mount interface 1336 may utilize manually movable locks or powered actuator driven locks that move between a further locking state and a releasing state for securing head 1334 relative to carrier 1400.

VAC LGS 1320 is similar to VAC LGS 1020 described above (also provided on harvester 1324). VAC LGS 1320 provides operator 32 with visual assists to facilitate alignment of mount interfaces 1336 with mounts 1342 and the loading of head 1334 onto carrier 1400. In the example illustrated, VAC LGS 1320 shares many of the components of system 420 described above. VAC LGS 1320 also comprises sensor 440, camera 442, monitor 444, windshield projector 446 and external projector 448, each of which is described above. VAC LGS 1320 comprises a controller 1450 which operates in place a controller 450 as part of vehicle connection guidance system 420 described above and which operates as a controller for VAC LGS 1320.

As when operating as part of system 420, sensor 440 outputs steering angle signals when operating as part of system 1320. Such steering angle signals are acquired and used by controller 450 to determine a current predicted path or trajectory of the mount interfaces 1336 when harvester 324 and is carried ahead 1334 are approaching attachment carrier 1400.

When being used as part of system 1320, camera 442 captures a video or images of the terrain or environment in front of head 1334 as well as the current location of attachment carrier 1400 being approached by harvester 1324. As described above, in some implementations, harvester 1324 may include multiple cameras at different angles, wherein the different captured images are merged or are selectable for viewing by operator 32.

Controller 1450 of harvester 1324 comprises a processor 1052 and a memory 1054 (shown in FIG. 11). The memory 1054 of controller 1450 contains instructions for directing the operation of processor 1052. In the example illustrated, controller 1450 is operable in at least two modes: (1) a vehicle connection guidance mode (described above respect to harvester 320 and FIG. 4) in which method 200 may be carried out to assist connecting harvester 1324 to head 1334; and (2) a vehicle attachment carrier loading guidance mode (described below) in which method 1200 may be carried out to assist loading of head 1334 onto carrier 1400.

In one implementation, controller 1450 is to receive input or commands from operator 32 indicating which of the two modes are to be initiated based upon such commands, operator 32 will carry out method 200 or method 1200. In another implementation, controller 1450 is to receive a general assist input or command (via a keyboard, touchpad, microphone or other input device), wherein controller 1450 automatically selects either the mode of method 200 on the motive method 1200 depending upon a sensed connection status of head 1334. In response to receiving signals from a sensor indicating head 1334 is presently connected to harvester 1324, controller 1450 automatically enters a mode in which method 1200 is carried out. In response to receiving signals from the sensor indicating head 1334 is not presently connected to harvester 1324, controller 1450 automatically enters a mode in which method 200 is carried out.

When controller 1450 is operating in the second mode in which method 1200 is carried out, the instructions contained in memory 1054 further direct processor 1052 to receive the steering angle signals from sensor 440, to analyze the steering angle signals by evaluating the current angle being dictated for the steering wheel 329 and using the current angle to determine a path of harvester 1324 and mount interface 326. The instructions contained in memory 1054 further direct processor 1052 to generate presentation signals based upon the determined path. One example of such a view or presentation 1459 being presented on display monitor 444 or otherwise presented on the windshield is outlined within broken lines in FIG. 14, wherein the projected or estimated path 1337 given the current steering angle of harvester 1324 is presented and wherein a recommended path 1339 given a determine location for mounts 1342 is also presented.

In the example illustrated, the instructions contained in memory 54 direct processor 1052 to prompt or permit operator 32 to select from one of various modes for the display of the visual presentation generated by controller 1450. In a first operator selected mode, controller 1450 outputs control signals causing the generated visual presentation to be presented on monitor 444. In such an implementation, monitor 444 may present a live stream or images of the real-world terrain or environment in front of harvester 1324 as captured by camera 442, wherein the visual presentation with the estimated or projected path 1337 of mount interfaces 1336 is overlaid upon the live stream or images of the real-world terrain or environment in front of harvester 1324.

In a second operator selected mode, controller 1450 outputs control signals causing windshield projector 446 to present the visual presentation generated by controller 1450. In such an implementation, the real-world terrain or environment is seen through the windshield 327 while the visual presentation including the projected path 1337 of mount interfaces 1336 on windshield 327, effectively being overlaid on the real-world terrain or environment.

In a third operator selected mode, controller 1450 outputs control signals causing external projector 448 to project the visual presentation with the projected path of mount interfaces 1336 (and the depiction of mount interfaces 1336) generated by controller 1450 directly upon the ground or terrain in front of harvester 324, wherein the visual presentation is overlaid upon the real world environment in front of harvester 1324 as seen through windshield 327. In one implementation, controller 1450 permits operator 32 to select multiple concurrent modes of operation such that the visual presentation with the projected path 1337 of mount interfaces 1336 is concurrently presented by two or more of monitor 444, windshield projector 446 and external projector 448.

In some implementations, controller 1450 may acquire images of the carrier 1400 in front of harvester 1324 from camera 442. In such an implementation, controller 1450 may analyze the captured images to identify the location of mounts 1342 of carrier 1400. Such analysis may involve a wide variety of different image processing methods and their combinations (e.g. color histogram, intensity in region of interest, segmentation, background, subtraction, template alignment, pattern recognition via machine learning and deep learning, and the like). Upon identifying the location of mounts 1342, controller 1450 may determine a recommended path 1339 of harvester 1324 for aligning and connecting mount interfaces 1336 with mounts 1342. The recommended path 1339 may be a path that achieve such a parallelism and alignment in the shortest amount of time or that reduces relatively sharp turns of harvester 1324. Controller 1450 may then output control signals causing the recommended path 1339 to be concurrently presented with the current projected path 1337. In response to the steering of harvester 1324 by the operator 32, the current projected path 1337 being presented will also change in real time. The operator may adjust the steering of harvester 1324 such that the current projected path 1337 closely approximates or coincides with the recommended path 1339 also being presented. In such a manner, system may additionally guide the operator in aligning mount interfaces 1336 with mounts 1342 on carrier 1400.

In some implementations, mount interfaces 1336 are at least partially concealed from view of an operator steering and controlling harvester 1324. For example, in some implementations, mount interface 1336 may extend along a backside or an underside of head 1334, at least partially concealed from an operator writing in a cab of harvester 1324 or at least partially concealed from cameras carried by harvester 1324. In one implementation, system 1320 provides additional assistance for connecting mount interfaces 1336 with mounts 1342 by augmenting a real-world, real-time view of the approach of head 1334 towards carrier 1400 with a depiction or representation of a mount interfaces 1336 on top of head 1334 at locations corresponding to the actual underlying or partially concealed locations of mount interfaces 1336.

Figure 15:
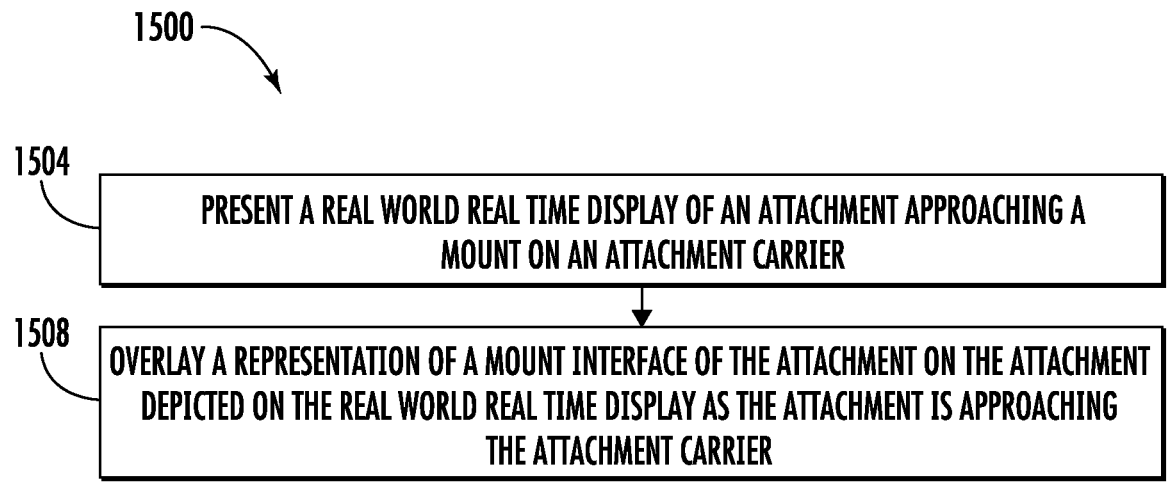
FIG. 15 is a flow diagram of an example vehicle attachment carrier loading guidance method.

FIG. 15 is a flow diagram of an example method 1500 for further assisting the operator in loading an attachment, such as head 1334, onto an attachment carrier, such as carrier 1400. As indicated by block 1504, a real time display of an attachment, such as head 1334, approaching a mount, such as mount 1336, on an attachment carrier, such as carrier 1400, is presented. As indicated by block 1508, a representation of a mount interface of the attachment is overlaid on the attachment depicted in the real-time display as the attachment is approaching the attachment carrier. The location of the overlaid depiction of the mount interface is fixed relative to the real-world presentation of the attachment. In other words, as the location of the attachment changes on the real-time display, the location of the representation of the mount interface of the attachment also correspondingly changes. For example, movement of the attachment to the left in the real world or real-time display will also result in the representation of the mount interface being generated by controller 1450 also moving to the left by the same mount in the real world or real-time display. As a result, despite the actual mount interface being partially concealed, the operator may precisely determine its location as it approaches the mount to aligning connector mount interface with the mount.

In some implementations, the real world, real-time view of the head 1334 may be captured by camera 442 and presented on a display monitor 444 for viewing by the operator 32. In other implementations, the real world, real-time view of header 1334 may be seen by an operator looking through a transparent panel, window or the like, wherein the depiction or representation of the mount interfaces 1336 of the header 1334 is projected or otherwise presented on the transparent window or panel. In some implementations, the real world, real-time view of header 1334 may be the header 1334 itself as seen by the operator, wherein the depiction or representation of the mount interfaces 1336 of the header 1334 are projected directly onto header 1334. Such an augmentation of the real-world real-time view of the header 1334 with the representation of the mount interfaces 1336, may assist the operator in operating and aligning the vehicle attachment with the attachment carrier in circumstances where the actual mount interface underlies the vehicle attachment or is otherwise difficult for the operator to see.

The augmentation of the real-world real-time view of the vehicle attachment with the representation of the attachment's mount interface may further offer greater design flexibility for the vehicle, attachment carrier and/or the vehicle attachment itself. Because such augmentation reduces reliance upon the operator being able to see or view the mount interface of the attachment when loading the attachment onto the attachment carrier, the mount interface and the mount on the attachment carrier may be located at a greater number of locations which may or may not offer visibility of the mount or mount interface. This greater flexibility after the location of the mount and/or mount interface may facilitate the design of an attachment carrier, vehicle attachment or vehicle that is more compact or that provides other design benefits. Such an augmentation may be used with or without the above described depiction of the path of the mount interface with respect to the mount.

In some implementations, loading of the attachment involves positioning the attachment on top of the carrier and on top of the mount. This may also result in the underlying mounts being at least partially concealed. In such an implementation, controller 1450 may additionally augment the real-world real time view by generating and presenting and overlaid image of the underlying mounts. In such circumstances, alignment and connection of the mount interfaces and the mount may be achieved by the operator steering the vehicle to align the overlaid images of the mount interfaces with the overlaid images of the mounts.

Figure 16:
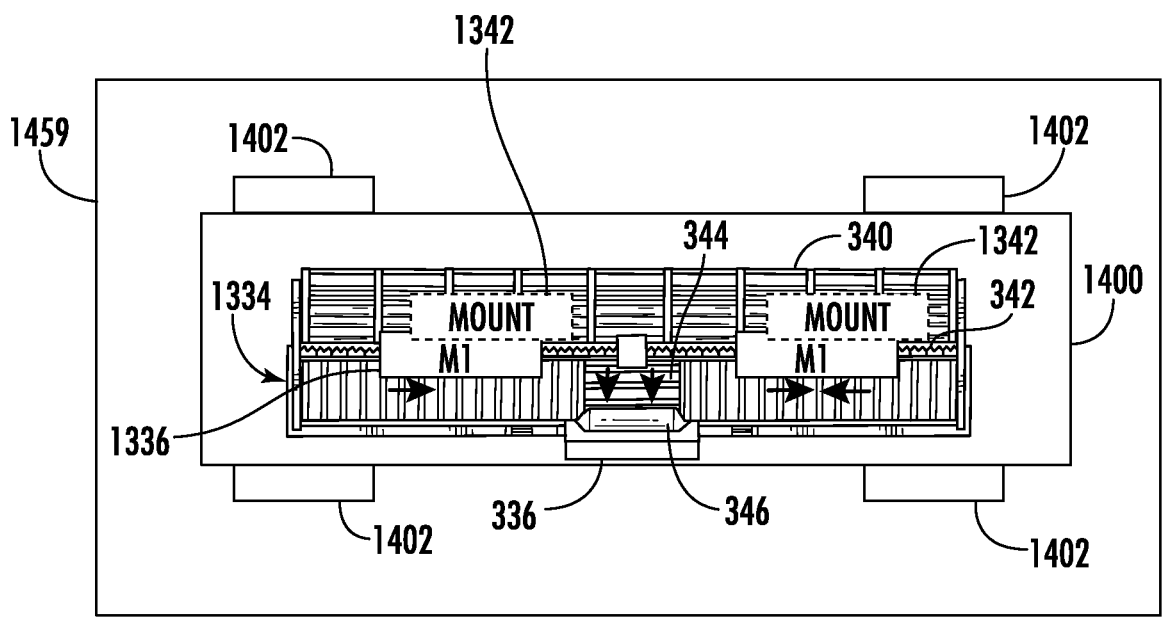
FIG. 16 is a diagram illustrating an example real world-view of an example attachment being loaded onto an attachment carrier, the real worldview being augmented with generated images of example mount interfaces and mounts which are schematically represented.

FIG. 16 illustrates an example real world view 1459 of the head 1334 being overlaid upon carrier 1400 during unloading. The real-world view 1459 may be presented on display monitor 444, or on the windshield of vehicle, such as harvester 1324 or be directly seen by an operator. The real-world view 1459 additionally includes augmented or added overlaid images of the underlying mount interfaces 1336 and the augmented or added overlaid images of the underlying mounts 1342 of carrier 1400. Alignment and connection of the mount interfaces 1336 and the mounts 1342 may be achieved by the operator steering harvester 1324 to align the overlaid images of the mount interfaces 1336 with the overlaid images of the mounts 1342.

In some implementations, controller 1450 may additionally determine a degree to which the mount interfaces 1336 and mounts 1342 are aligned as head 1334 is being moved towards carrier 1400. For example, the distance or spacing between the perimeter of mount interfaces 1336 and the corresponding edges of mounts 1342 may be measured, or the distance or spacing may be compared against a predetermined threshold. Based upon the comparison, the controller may help control signals causing an alignment indicator to be output to the operator.

In one implementation, the alignment indicator may be visual. For example, the augmented or overlaid images of the mount interfaces 1336 and/or mounts 1342 on the real-world view may change in color or brightness based upon the current degree of alignment between mount interfaces 1336 and mounts 1342. A final alignment state at which head 1334 may be released onto the carrier (and disconnected from the harvester) may be indicated by a distinct color or brightness. In some implementations, the alignment indicator may comprise a numerical value or color presented on a display screen are presented by various light emitting diodes or the like. In some implementations, an audible sound or signal output through a speaker may indicate the degree of alignment. For example, audible sounds may become greater in intensity and/or frequency as alignment between mount interfaces 1336 and mounts 1342 is improved.

In some implementations, camera 442 may comprise multiple spaced stereoscopic cameras 442. In such an implementation, controller 1450 may analyze the images provided by cameras 442 to identify the perimeter edges of head 1334 or to identify other distinguishing structures of head 1334. Based upon the identified perimeter edges of head 1334 or other distinguishing structures, controller 1450 may then estimate the relative spatial location of mount interfaces 1336 in circumstances where mount interface 1336 may not be directly viewable by cameras 442. In other implementations, where mount interfaces 1336 are directly viewable by cameras 442, controller 1450 may identify the perimeter edges, center and other spatial reference points of mount interfaces 1336 to project the path of mount interfaces 1336 towards mounts 1342 and/or augment a real worldview with visual representations or images of mount interfaces 1336.

In some implementations, controller 1450 may analyze images provided by cameras 442 to additionally identify the perimeter edges or other distinct surfaces of head carrier 1400. Based upon the identified perimeter edges of carrier 1400 or other distinguishing structures, controller 1450 may then estimate the relative spatial location of mounts 1342 in circumstances where mount 1342 may not be directly viewable by cameras 1342. In other implementations, where mounts 1342 are directly viewable by cameras 1442, controller 1450 may analyze images to identify the perimeter edges, center and other spatial reference points of mounts 1342 to determine the degree of alignment between mount interfaces 1336 and mounts 1342 as head 1334 is positioned with respect to carrier 1400.

In some implementations, controller 1450 may identify the edges or other distinguishing surfaces feeder house 325, head 1334, mount interfaces 1336, connection interfaces 326, 336, carrier 1400 and/or mounts 1342 using various modules in the form of instructions stored on a non-transitory computer-readable medium which direct a processor to carry out various actions and analysis based upon the captured images from cameras 442. In one implementation, controller 1450 may comprise structure identification modules, localization modules, classifier modules and position estimator modules.

In one embodiment, the structure identification module comprises a classifier that is configured to identify candidate pixels in the image data for a particular structure (feeder house 325, head 1334, mount interfaces 1336, connection interfaces 326, 336, carrier 1400 and/or mounts 1342) based at least one of reflectivity, intensity, color or texture features of the image data (or pixels), of the rectified image data or raw image data. Each classifier module applies or includes software instructions on an algorithm that identifies candidate pixels that are likely part of the structure based on expected color and texture features within the processed or raw image data. For example, in one configuration, each structure may be painted, coated, labeled or marked with a coating or pattern of greater optical or infra-red reflectivity, intensity, or luminance than a remaining portion of the harvester or the carrier 1400. The greater luminance, intensity or reflectivity of the structure (or associated structure pixels of the image data versus background pixels) may be attained by painting or coating the structure (feeder house 325, head 1334, mount interfaces 1336, connection interfaces 326, 336, carrier 1400 and/or mounts 1342) with white, yellow, chrome or a lighter hue or shade with respect to the other surrounding structures (within the field of view of the cameras 442.

In one implementation, each localization module is adapted to estimate a relative position of the particular structure (feeder house 325, head 1334, mount interfaces 1336, connection interfaces 326, 336, carrier 1400 and/or mounts 1342) to the cameras 442 based on the classified, identified candidate pixels of a portion of the particular structure (feeder house 325, head 1334, mount interfaces 1336, connection interfaces 326, 336, carrier 1400 and/or mounts 1342. Each localization module can estimate a structure's position relative to the mounting location of the imaging device, or optical axis, or reference axis of one or more imaging devices, based on previous measurements to provide constraint data on where the structure can be located possibly.

Each structure position estimator module may receive input of previous measurements and structure reference data and outputs an estimate of the structures position, angle, or its associated error.

In one embodiment, each localization module comprises a Kalman filter. The Kalman filter outputs constraints on where the structure can be located, an estimated position, or a location zone or estimated position zone. The localization module takes pixels that are classified as belonging to structure and uses a disparity image (from stereo correspondence data) to estimate the relative location of the structure to a first one of cameras 442, a second one of cameras 442, or both, or reference axis or coordinate system associated with the vehicle.

In some implementations, controller 1450 may comprise an optional edge detector and an optional linear Hough transformer. The optional edge detector is coupled to the linear Hough transformer. In turn, the linear Hough transformer is coupled to the localization module. an edge detector 105 for measuring the strength or reliability of one or more edges 181, or points on the container perimeter 81 in the image data; (2) a linear Hough transformer for identifying an angle and offset of candidate linear segments in the image data with respect to a reference point on an optical axis, reference axis of the one or more cameras 442; (3) a localization module adapted to use spatial and angular constraints to eliminate candidate linear segments that cannot logically or possibly form part of the identified linear segments of the structure, or points on the structures perimeter; and (4) the localization module transforms the non-eliminated, identified linear segments, or identified points, into two or three dimensional coordinates relative to a reference point or reference frame of the harvester, head or carrier.

The edge detector may apply an edge detection algorithm to rectified image data. Any number of suitable edge detection algorithms can be used by the edge detector. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector may provide a numerical output, signal output, or symbol, indicative of the strength or reliability of the edges in field. For example, the edge detector may provide a numerical value or edge strength indicator within a range or scale or relative strength or reliability to the linear Hough transformer 107.

The linear Hough transformer receives edge data (e.g., an edge strength indicator) and identifies the estimated angle and offset of the strong line segments, curved segments or generally linear edges (e.g., of the structure) in the image data. The estimated angle is associated with the angle or compound angle (e.g., multidimensional angle) from a linear axis that intercepts the lenses of a first camera 442, a second camera 442, or both. The linear Hough transformer may comprise a feature extractor for identifying line segments of objects with certain shapes from the image data. For example, the linear Hough transformer may identify line equation parameters or ellipse equation parameters of objects in the image data from the edge data outputted by the edge detector, or Hough transformer may classify the edge data as a line segment, an ellipse, or a circle. Thus, it is possible to detect structures with generally linear, rectangular, elliptical or circular features. For example, the detection of the edge of head 1334 in image data and its corresponding coordinates (e.g., in three dimensions) may provide an indication or identification of the location of connection interfaces 336 and/or the mount interfaces 1336. Although each of the above-described modules has been described in the context of using image data from cameras 442, it should be appreciated that such models may also be employed with other types of imaging devices or sensors, such as lidar, radar, ultrasonic sensors and the like, for detecting, identifying and locating structures (feeder house 325, head 1334, mount interfaces 1336, connection interfaces 326, 336, carrier 1400 and/or mounts 1342).

Figure 17:
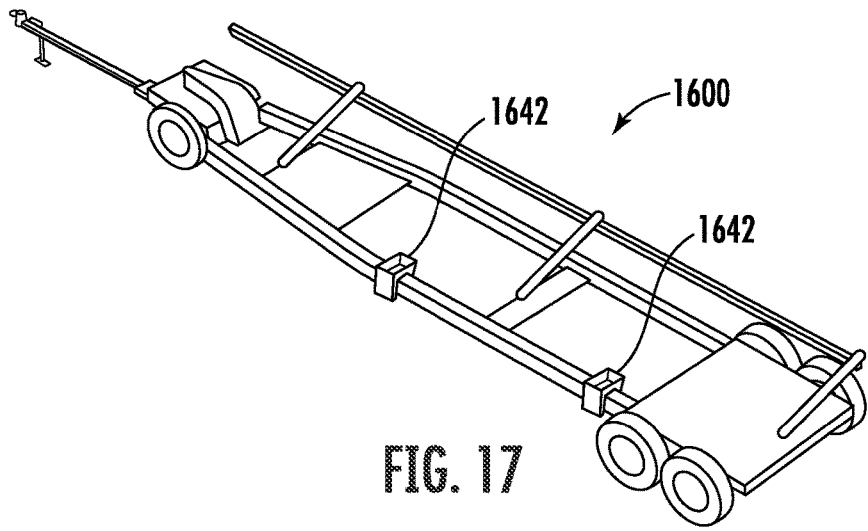
FIG. 17 is a top perspective view of an example vehicle attachment carrier.

FIG. 17 is a top perspective view of an example attachment carrier 1600 in the form of a trailer. Attachment carrier 1600 is configured for carrying a harvester head. In the example illustrated, attachment care 1600 comprises mounts 1642. Each of mounts 1642 comprises an upwardly facing cavity or pocket for receiving corresponding mount interfaces of a harvester head.

Figure 18:
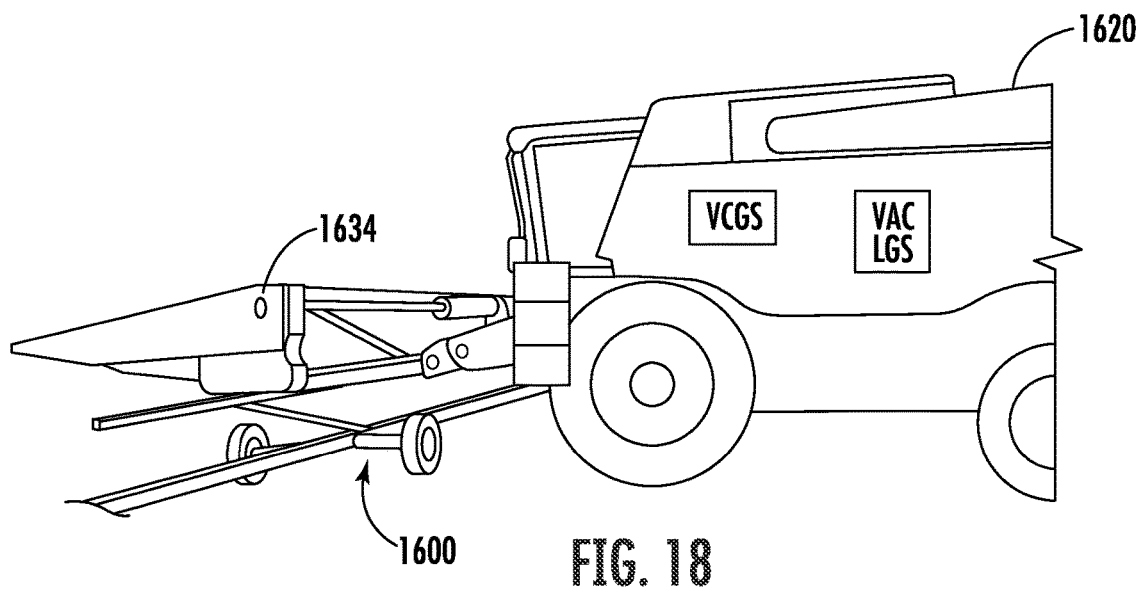
FIG. 18 is a perspective view of an example harvester unloading an example head onto an example carrier.
Figure 19:
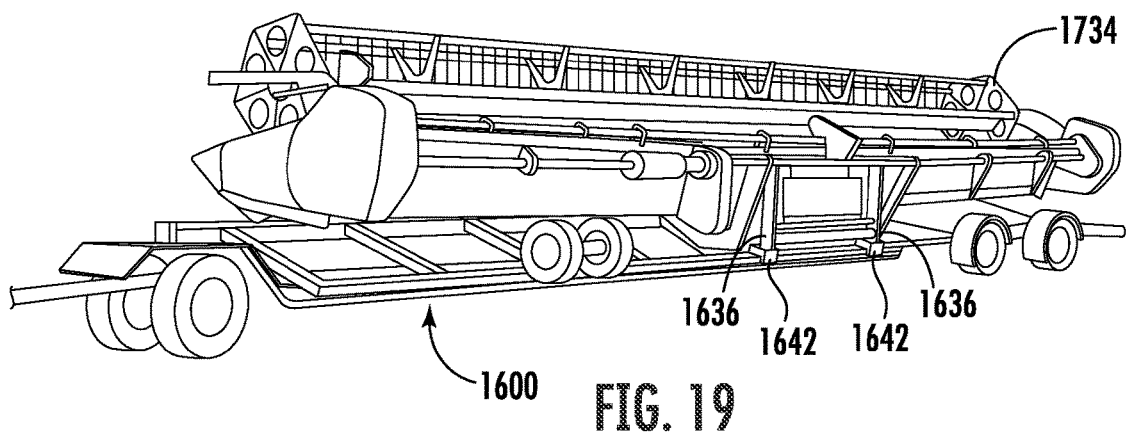
FIG. 19 is a rear perspective view of an example head loaded onto the example carrier of FIG. 17.

FIG. 18 is a perspective view of an example harvester 1620 carrying and locating an example corn head 1634 onto carrier 1600. Harvester 1620 is similar to harvester 1324 described above. Harvester 1620 comprises both vehicle connection guidance system 420 and VAC LGS 1320 described above. FIG. 19 is a perspective view of another example head 1734, a draper head, loaded upon carrier 1600 and following disconnection from harvester 1620. As shown by FIG. 19, head 1734 (as well as head 1634 shown in FIG. 18) each include mount interfaces 1636 that are captured and received within mounts 1642 to inhibit horizontal movement of the head relative to the underlying carrier 1600 and which also assist in indicating the proper centering and position of the head 1634, 1734 on carrier 1600.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle attachment carrier loading guidance system comprising:
    a sensor for being supported by a vehicle supporting a removable attachment having a mount interface for interacting with a mount on an attachment carrier distinct from the vehicle, wherein the sensor is to output steering angle signals; and
    a controller to output presentation signals based upon the steering angle signals, wherein the presentation signals are to generate a visual representation of a projected path of the mount interface with respect to the mount.

2. The vehicle attachment carrier loading guidance system of claim 1 further comprising:
    a camera to be supported by the vehicle; and
    a display to present a real-time image captured by the camera, wherein presentation signals are to cause the projected path of the mount interface to be overlaid on the real-time real-world image presented by the display.

3. The vehicle attachment carrier loading guidance system of claim 2 further comprising the vehicle, wherein the sensor extends along a front of the vehicle.

4. The vehicle attachment carrier loading guidance system of claim 3, wherein the vehicle comprises a harvester and wherein the mount interface extends along a front end of the harvester.

5. The vehicle attachment carrier loading guidance system of claim 1, wherein the attachment carrier comprises a trailer, wherein the mount comprises a cradle and wherein the mount interface comprises a cradle interface.

6. The vehicle attachment carrier loading guidance system of claim 1, wherein the vehicle attachment comprises a second mount interface, spaced from the mount and wherein the presentation signals are to further generate a visual presentation of the mount interface and the second mount interface.

7. The vehicle attachment carrier loading guidance system of claim 1, wherein the vehicle comprises a harvester, wherein the vehicle attachment comprises a header and wherein the mount interface extends along a bottom of the header.

8. The vehicle attachment carrier loading guidance system of claim 1 further comprising a projector, wherein the presentation signals cause a projector to project the visual presentation of the projected path of the mount interface onto a terrain upon which the vehicle is to traverse.

9. The vehicle attachment carrier loading guidance system of claim 1 further comprising the vehicle, the vehicle comprising a transparent window panel through which the operator may view the mount interface, wherein the presentation signals cause the projected path of the mount interface to be overlaid on transparent window panel.

10. The vehicle attachment carrier loading guidance system of claim 1, wherein the presentation signals are to further generate a target position for the mount interface.

11. The vehicle attachment carrier loading guidance system of claim 1, wherein the presentation signals are to further generate and overlay a representation of the mount interface of the removable attachment on a real world view the removable attachment.

12. The vehicle attachment carrier loading guidance system of claim 1, wherein the controller is to output control signals causing an alignment indicator to be output, the alignment indicator being based upon a degree of alignment between the mount interface and the mount.

13. The vehicle attachment carrier loading guidance system of claim 1, wherein the presentation signals are to further generate and overlay a representation of the mount of the carrier on a real world view of the carrier.

14. A vehicle attachment carrier loading guidance method comprising:
   receiving steering angle signals from a sensor indicating a current steering angle of a vehicle having a removable attachment having a mount interface for interacting with a mount on an attachment carrier that is distinct from the vehicle; and
   overlaying a projected path of the mount interface on a real-time view of an approach of the vehicle towards the attachment carrier based upon the steering angle signals.

15. The method of claim 14 further comprising overlaying a representation of the mount interface on the real-time view of the approach of the vehicle towards the attachment carrier.

16. The method of claim 15 further comprising:
   capturing a real-time view of the approach of the vehicle towards the attachment carrier with a camera; and
   presenting the real-time view of the approach on a display, wherein the projected path of the mount interface is overlaid on the real-time view of the approach on the display.

17. The method of claim 16, wherein the vehicle comprises a harvester, wherein the vehicle attachment comprises a header and wherein the sensor is carried by the vehicle.

* * * * *